United States Patent [19]

Akins, III et al.

[11] Patent Number: 5,715,515

[45] Date of Patent: Feb. 3, 1998

[54] METHOD AND APPARATUS FOR DOWNLOADING ON-SCREEN GRAPHICS AND CAPTIONS TO A TELEVISION TERMINAL

[75] Inventors: Glen L. Akins, III, Tucker; Robert O. Banker, Cumming; David B. Lett, Duluth, all of Ga.

[73] Assignee: Scientific-Atlanta, Inc., Norcross, Ga.

[21] Appl. No.: 306,442

[22] Filed: Sep. 19, 1994

Related U.S. Application Data

[63] Continuation-in-part of Ser. No. 72,291, Jun. 7, 1993, Ser. No. 983,909, Dec. 2, 1992, and Ser. No. 73,404, Jun. 7, 1993, abandoned.

[51] Int. Cl.$^6$ .............. H04H 1/00; H04H 1/02; G09G 5/36; H04N 7/10
[52] U.S. Cl. .............. 455/4.1; 345/189; 348/6; 348/10; 455/6.2
[58] Field of Search ............... 348/6, 7, 9, 10, 348/563, 564, 584, 589, 600, 12, 13; 380/20; 455/4.1, 4.2, 5.1, 6.2; 345/23, 24, 25, 27, 116, 141, 189, 191, 192, 194, 195; H04N 5/445, 7/10, 9/74

[56] References Cited

U.S. PATENT DOCUMENTS

| | | | |
|---|---|---|---|
| Re. 32,187 | 6/1986 | Barda et al. | 345/194 |
| 4,290,063 | 9/1981 | Traster | 345/141 |
| 4,437,093 | 3/1984 | Bradley | 345/125 |
| 4,496,976 | 1/1985 | Swanson et al. | 348/564 |
| 4,520,356 | 5/1985 | O'Keefe et al. | 345/194 |
| 4,600,921 | 7/1986 | Thomas | 340/825.31 |
| 4,633,297 | 12/1986 | Skerlos et al. | 348/589 |
| 4,712,239 | 12/1987 | Frezza et al. | 380/20 |
| 4,739,318 | 4/1988 | Cohen | 345/142 |
| 4,742,344 | 5/1988 | Nakagawa et al. | 345/26 |
| 4,745,468 | 5/1988 | Von Kohorn | 348/13 |
| 4,876,592 | 10/1989 | Von Kohorn | 348/13 |
| 4,885,775 | 12/1989 | Lucas | 380/10 |
| 4,890,321 | 12/1989 | Seth-Smith et al. | 380/20 |
| 4,926,255 | 5/1990 | Von Kohorn | 348/13 |
| 4,991,011 | 2/1991 | Johnson et al. | 348/589 |
| 4,994,908 | 2/1991 | Kuban | 348/8 |
| 5,034,807 | 7/1991 | Von Kohorn | 348/13 |
| 5,057,915 | 10/1991 | Von Kohorn | 463/9 |
| 5,058,160 | 10/1991 | Banker et al. | 380/20 |
| 5,109,279 | 4/1992 | Ando | 348/564 |
| 5,128,752 | 7/1992 | Von Kohorn | 348/3 |
| 5,146,210 | 9/1992 | Herberle | 345/146 |
| 5,227,874 | 7/1993 | Von Kohorn | 348/2 |
| 5,231,665 | 7/1993 | Auld et al. | 380/20 |
| 5,247,364 | 9/1993 | Banker et al. | 348/569 |
| 5,249,044 | 9/1993 | Von Kohorn | 348/12 |
| 5,260,778 | 11/1993 | Kauffman et al. | 348/6 |
| 5,270,809 | 12/1993 | Gammie et al. | 348/1 |
| 5,283,734 | 2/1994 | Von Kohorn | 463/17 |
| 5,414,448 | 5/1995 | Wada et al. | 345/194 |
| 5,422,674 | 6/1995 | Hooper et al. | 348/6 X |
| 5,473,704 | 12/1995 | Abe | 345/194 |
| 5,477,262 | 12/1995 | Banker et al. | 348/7 |

*Primary Examiner*—John K. Peng
*Assistant Examiner*—John W. Miller
*Attorney, Agent, or Firm*—Banner & Witcoff, Ltd.

[57] ABSTRACT

A method of downloading on-screen graphics and captions to a television terminal for display comprises a system manager computer and data transmission apparatus coupled thereto for transmitting program code, cube definition data and downloadable display commands to the terminal. Manufacturer intervention is minimized in that the system operator scans a graphic image to create a bit map and encodes the bit map into the cube definition data. The system manager also generates display control commands for downloading to the terminal without manufacturer intervention which control when, how long, where and how the graphic image is displayed. In this manner, a system operator may generate a custom screen for display representing their particular logo or service name. Moreover, screen data for different service names are addressably downloaded to different groups of subscribers to the different services. The program code, the cube definition data and the downloadable display commands may be globally or addressably downloaded via in-band video, in-band audio or outband data transmission. The output graphics for display may be accompanied by a predetermined audio signal.

27 Claims, 23 Drawing Sheets

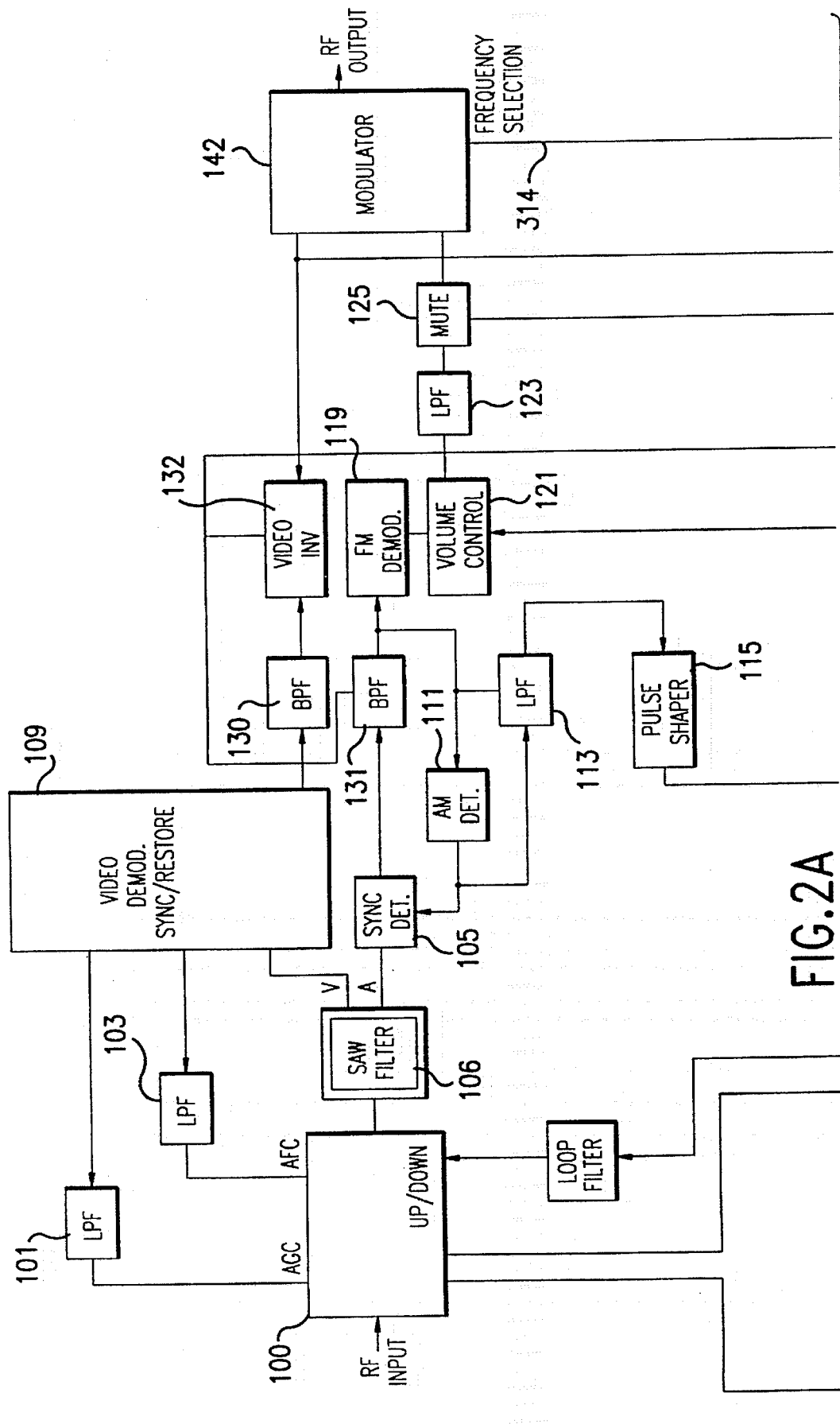

VIDEO PARAMETERS

| SYNC S | SYNC E | V SYNC S | V SYNC E | CB S | CB E | EP S | EP E |
|---|---|---|---|---|---|---|---|

R1

BORDER SCREEN PARAMETERS

| 12 COLOR | 9 SH | 9 EH | 9 SV | 9 EV | CONT. |
|---|---|---|---|---|---|

R2

CONTROL PARAMETERS

| INT | BD BR | ILC | PAL FOR | PAL/ NTSC | GSEL | EN | UNB | UA | PR | BK |
|---|---|---|---|---|---|---|---|---|---|---|

R3

SYMBOL SCREEN PARAMETERS

| 9 SH | 9 EH | 9 SV | 9 EV |
|---|---|---|---|

R4

GRAPHICS SCREEN PARAMETERS

| 9 SH | 9 EH | 9 SV | 9 EV |
|---|---|---|---|

R5

BLACK

| 12 COLOR |
|---|

R6

WHITE

| 12 COLOR |
|---|

R7

SYMBOL SCREEN BASE ADDRESS

| 24 ADDRESS |
|---|

R8

GRAPHICS SCREEN BASE ADDRESS

| 24 ADDRESS |
|---|

R9

PALETTE REGISTERS

| | FOREGROUND COLOR | BACKGROUND COLOR |
|---|---|---|
| 0 | | |
| : | | |
| 15 | FOREGROUND COLOR | BACKGROUND COLOR |

R10

SYMBOL LINE ATTRIBUTE

| | 2 DEF REG | ULI | UP | PALETTE REG |
|---|---|---|---|---|
| 0 | | | | |
| : | | | | |
| 15 | DEF REG | ULI | UP | PALETTE REG |

R11

SYMBOL SET DEFINITION

| | M | N | NYBBLES/SYM | SYMBOL DEF BA |
|---|---|---|---|---|
| 0 | | | | |
| : | | | | |
| 3 | M | N | NYBBLES/SYM | SYMBOL DEF BA |

| BYTE | | | | | | | | |
|---|---|---|---|---|---|---|---|---|
| 0 | 0 | | vbi | aud | 0 | | 0 | 0 |
| 1 | | | DISPLAY msb | | | | | |
| 2 | | | " | midsb | | | | |
| 3 | | | " | lsb | | | | |
| 4 | PAGE | | | | OFF | 1 | | 0 |
| 5 | | | TRANSACTION CODE | | | | | |
| 6 | 1stsq | | SEQUENCE | | | | | |
| 7 | | | DISPLAY DATA | | | | | |
| 8 | | | DISPLAY DATA | | | | | |
| 9 | | | DISPLAY DATA | | | | | |
| 10 | | | DISPLAY DATA | | | | | |
| 11 | | | DISPLAY DATA | | | | | |
| 12 | | | DISPLAY DATA | | | | | |
| 13 | | | DISPLAY DATA | | | | | |
| 14 | | | DISPLAY DATA | | | | | |
| 15 | | | DISPLAY DATA | | | | | |
| 16 | | | DISPLAY DATA | | | | | |
| 17 | | | DISPLAY DATA | | | | | |
| 18 | | | DISPLAY DATA | | | | | |
| 19 | | | DISPLAY DATA | | | | | |
| 20 | | | DISPLAY DATA | | | | | |
| 21 | | | DISPLAY DATA | | | | | |

FIG.16

** = FOREGROUND COLOR
.. = BACKGROUND COLOR
— = WHITE REGISTER
TOTAL OF 12 CUBES - EACH CUBE IS 13 BY 12 BY 2 PIXELS

METHOD AND APPARATUS FOR DOWNLOADING ON-SCREEN GRAPHICS AND CAPTIONS TO A TELEVISION TERMINAL

This is a continuation-in-part of application Ser. No. 08/072,291 filed Jun. 7, 1993 entitled "Display System with Programmable Display Parameters", of application Ser. No. 07/983,909, filed Dec. 2, 1992 entitled "Reprogrammable Subscriber Terminal" and of application Ser. No. 08/073,404 filed Jun. 7, 1993 entitled "Display System for a Subscriber Terminal", now abandoned.

FIELD OF THE INVENTION

This invention relates to the field of subscription television terminals and, in particular, to a method and apparatus for downloading on-screen graphics and captions, for example, a cable television system logo and system or trade name to a television terminal for display on an associated television screen upon turning "on" the terminal.

BACKGROUND OF THE INVENTION

A subscriber communications terminal, known in the cable television industry as the Scientific-Atlanta 8600X terminal, available from Scientific-Atlanta, Inc., Atlanta, Ga., is reprogrammable. That is, new controller software for controlling the operation of the terminal is downloadable from a cable television headend as described in U.S. patent application Ser. No. 07/983,909, filed Dec. 1, 1992 and incorporated herein by reference. The terminal comprises a multifunction control circuit (MCC) which controls the input of data to the subscriber terminal from the headend of a subscription television system. The MCC controls a plurality of decoders for in-band data (typically in the horizontal or vertical blanking interval of the television signal), in-band audio data, and out-of-band data which it buffers in a volatile memory area. Among the multiplicity of transactions between the headend and the subscriber terminal are several to download program code and/or program code parameters from the headend into the memory space of the control microprocessor. The control program can thus be changed, upgraded, additional features added, obsolete features disabled and the like.

Moreover, in connection with the reprogrammability feature, the 8600X terminal comprises an on-screen display system for generating character and graphics displays for viewing on a screen of an associated television set as described by U.S. application Ser. No. 08/073,404 filed Jun. 7, 1993, entitled "Display System for a Subscriber Terminal" and incorporated herein by reference. The described display system comprises a display processor and a display memory which is partitioned into a symbol screen definition section, a symbol set definition section and a graphics screen definition section. The display processor can produce a text or symbol display, a graphics display or combinations of text and graphic displays. This flexibility permits text to be written with an overlay of graphics, such as a logo or the like. The generated display may be of varying size and positioned at any desired location of the display area. The symbol definitions and display parameters are programmable into the subscriber terminal memory from the headend.

The programmability of the display parameters of the 8600X terminal is described in U.S. application Ser. No. 08/072,291 filed Jun. 7, 1993, entitled "Display System with Programmable Display Parameters" and incorporated herein by reference. In one described embodiment, stored display data and display attributes are downloadable from the system manager of the headend into non-volatile memory of the subscription terminal, such as Flash EPROM or battery backed-up RAM. The stored screen information and attributes are downloaded in a global manner with other executable code and data for all the subscriber terminals. In another embodiment, a series of display transactions are used to build screen displays with the on-screen display information and display attributes. A high level display language is described where communication transactions are sent globally or addressably to subscriber terminals. The transactions describe screens which are preferably compressed, the compressed information being decoded by expansion routines into a common format for display and loaded in the same area as other display and display attribute data. The downloaded data then is acted on by the display processor in the same way as other display information and attributes.

On the other hand, to provide the capability for a display of a custom graphic and caption such as a stylized logo and name of a system operator in color, the logo and caption must be custom-designed at the equipment manufacturer's location and forwarded to the system operator in the form of a memory module containing the pre-stored data. Referring briefly to FIGS. 18 and 19, the manufacturer provides program code and "cube" data (graphic cubic section definition data) via an SRAM which the system manager must insert into a downloading scrambler for downloading to a terminal. Moreover, the manufacturer also provides downloadable display commands of a database via disk or tape for insertion into the personal computer comprising a Scientific-Atlanta System Manager 10 computer. Such an operation requires considerable time and effort on the part of the equipment manufacturer (Scientific-Atlanta) to provide, including the steps of scanning an image, finishing the image, encoding the image in a first memory and encoding downloadable display commands in a second memory for delivery to the system operator.

SUMMARY OF THE INVENTION

It is an object therefore of the present invention to provide a method and apparatus for downloading graphic and caption data which alleviates, if not, eliminates participation by the equipment manufacturer.

It is a further object of the present invention to provide a means whereby the system operator is self-sufficient; the system operator custom designs their own graphic and caption screens for downloading to the subscriber terminal.

It is a further object of the present invention to provide a method and apparatus whereby the system operator may download first graphic and caption data addressably to a first group of subscriber terminals and second graphic and caption data addressably to a second group of subscriber terminals.

According to the principles of the present invention, steps that must be undertaken by the equipment manufacturer are either alleviated or eliminated in accordance with the present invention. According to a first method and apparatus according to the present invention, program code on disk is provided by the manufacturer for the system operator's insertion into the system manager. The code contains means for controlling the creation of room or gaps for extra cubes which are downloaded later. Then, a bit map of the logo (the new cube definition data) is separately inserted into the system manager and downloaded to fill the gaps created in the code. The code and/or cube definitions are downloaded via the pre-assigned download scrambler, and downloadable display commands are downloaded via transactions through the pre-assigned barker/text channel scrambler.

Preferably, via the system manager computer, a second embodiment of the present invention permits the system operator to design and encode their own custom logo and caption and display control commands for downloading. Program code permitting such an implementation is provided by the manufacturer for installation via the system manager. The download scrambler in this embodiment is used for transmitting the program code via code download transactions. The barker/text channel scrambler in this embodiment is used to transmit system operator encoded cube definition data and downloadable display command transactions.

BRIEF DESCRIPTION OF THE DRAWINGS

FIG. 14 is a detailed pictorial representation of the registers which can be configured in the display controller illustrated in FIG. 11.

FIG. 16 is a pictorial representation of a display transaction.

DETAILED DESCRIPTION OF THE PREFERRED EMBODIMENTS

Figure 1:
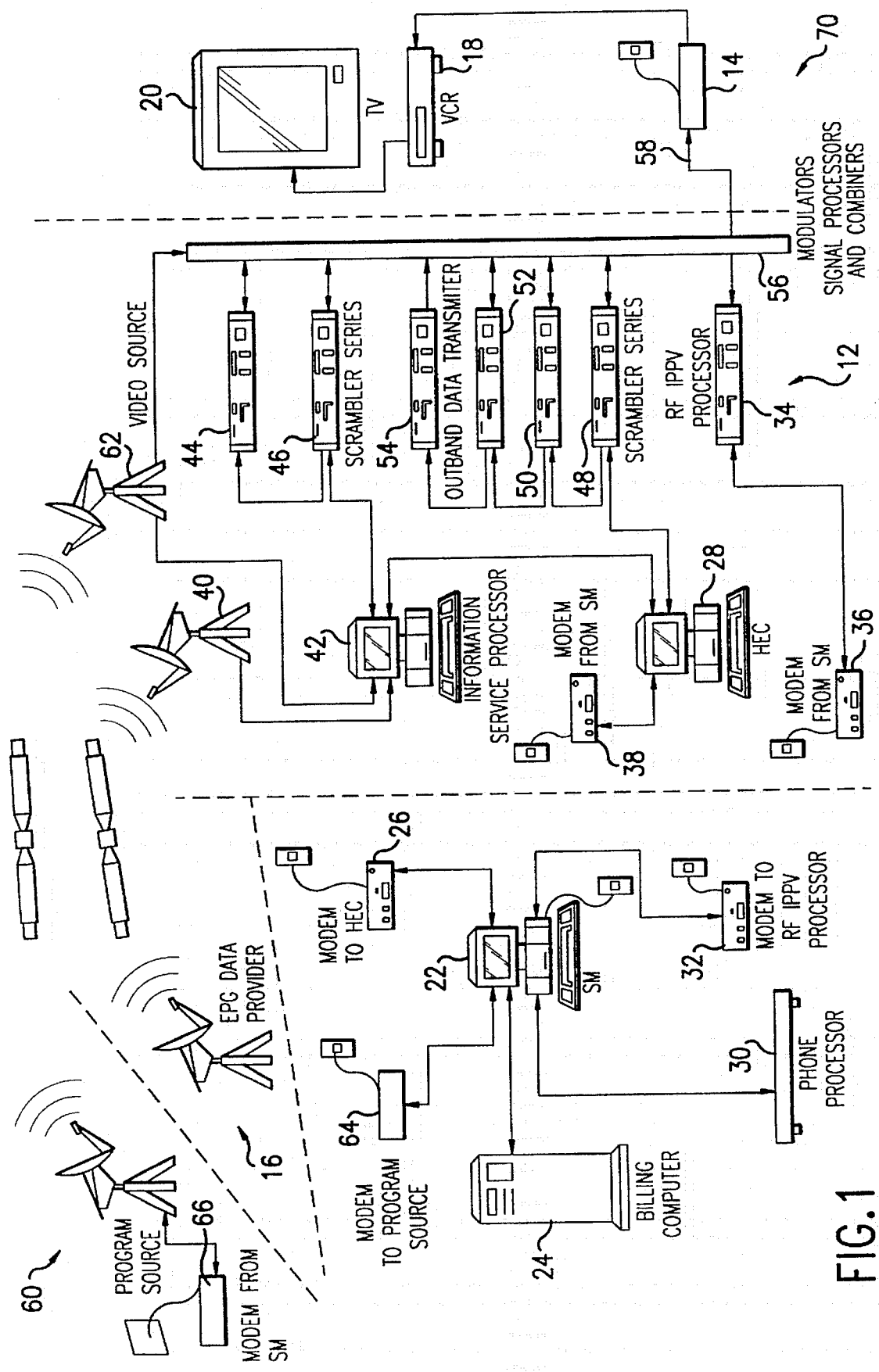
FIG. 1 is a detailed block schematic diagram of a subscription television system according to the present invention comprising a system manager 22 for controlling the downloading of graphics and captions to subscriber television terminals 14 via scramblers 44–52, out-of-band data transmitter 54 or other data transmitters such as data repeaters as described further herein.

FIG. 1 is a detailed diagram of an interactive subscription television system according to the instant invention. The system of FIG. 1 is intended to serve as an example and should not be construed as limiting the invention. A central control center 10 orchestrates the operation of the subscription television system. Central control center 10 is often associated with the central office of a multi-service system operator and may communicate with and control multiple headends, such as headend 12. Headend 12 provides a plurality of subscription and non-subscription services, including television service, to a local area, for example, a city or a group of cities, or towns. Other services may include telecommunications, energy management, home shopping and other interactive or non-interactive services.

A subscriber terminal 14 is also shown and may be located in a subscriber's home or business location 70. Subscriber terminal 14 is typically coupled to video cassette recorder (VCR) 18 and television 20 as shown. It should be clear that the subscriber terminal 14 can also be coupled directly to the television 20 (not shown). Information may be communicated between central control center 10 and headend 12 by any known means including telephone networks, satellite transmissions, optical fibers, coaxial cable, other transmission lines, telecommunication apparatus, etc. or any combination of known means. Headend 12 may be coupled to subscriber terminals 14 of a plurality of subscribers via a subscription television distribution system 58, for example coaxial cables, satellite, optical fibers, telecommunication apparatus, or other known means or combinations of known means.

Central control center 10 includes a system manager 22 that directs the other components of central control center 10. System manager 22 is a PC/based computer system having a processor and memory for providing a graphical user interface that allows an operator to generate addressable control transactions that are downloaded to the subscriber terminals 14 of the subscription television service. The addressable control transactions may be directed to terminal operation, pay-per view, and messages. The addressable control transactions may also include menu screens and interactive and non-interactive screens including custom graphics and captions, according to the present invention. System manager 22 preferably comprises a Scientific-Atlanta System Manager 10 Network Controller, most conveniently, a typical personal computer comprising keyboard and monitor with a UNIX-based operating system and appropriate applications software as will be discussed further herein.

Using the graphical interface of the system manager 22, the operator may construct a screen or menu screen according to the present invention and command that the screen be downloaded to subscriber terminals 14 of the subscription television service on a global, group, or individual basis. Upon receiving the download command, the system manager 22 generates a transaction containing screen data along with a screen identifier to the subscriber terminals 14. Typically, the terminal is commanded to display the screen comprising the custom graphics until a first command is entered via the remote control or other means of subscriber terminal 14.

For interactive services, the system includes a return path communication link between the subscriber terminals 14 and the system manager 22. Typically, as shown in FIG. 1, headend 12 includes an RF IPPV processor 34 for receiving return path information transmitted from an RF-IPPV module within the subscriber terminal 14 over at least one reverse pass band of frequencies, and a modem 36 that retransmits the return path data from the RF IPPV processor 34 to the system manager 22 via modem 32. The central control center 10 may alternatively or in addition include a phone processor 30 for receiving return path information directly from a telephone type IPPV module within subscriber terminal 14.

The system manager 22 communicates to headend controller ("HEC") 28 of the headend 12, for example, via modems 26 and 38. Data transmissions between the system manager 22 and HEC 28 may follow the RS-232C communication protocol but are not limited in this respect. For example, authorization data may be transmitted from system manager 22 to HEC 28. HEC 28 formats the authorization data and transmits it to subscriber terminals either in-band through scramblers 48, 50 or 52 on scrambled channels, data repeaters (not shown) for unscrambled channels or out-of-band through outband data transmitter 54, for example, at 108.2 MHz. HEC 28 is preferably a Scientific-Atlanta Model 8658 headend controller.

Central control center 10 may also, for example, provide billing services for the services provider, including billing for pay-per-view events. A billing computer 24 stores billing data and may also format and print bills.

An electronic programming guide (EPG) data provider 16 supplies television schedule data to headend 12 via satellite receiver 40 or by other known means such as, but not limited to, cable, optical fiber, and telecommunications. This data includes program information arranged by time and channel. One such service is offered by StarSight Telecast Inc. The Insight service provides extensive television program listings. Cable operators can purchase this data and provide it to their subscribers.

The EPG data received by satellite receiver 40 is passed to information service processor ("ISP") 42. The transmission of EPG data from satellite receiver 40 to ISP 42 may follow the RS-232C communication protocol but is not limited in this respect. ISP 42 may also receive text data for transmission to subscribers. The text data may include weather information, sports scores, messages, etc. and may be provided by an information service provider, or accumulated or generated by the system operator. ISP 42 is responsible for receiving the EPG data, as well as the other data, and transmitting it to the subscribers. ISP 42 provides data to scramblers 44 and 46. The transmission of data from ISP 42 to scramblers 44 and 46 may follow the RS-485 communication protocol but is not limited in this respect. Of course, the actual number of scramblers to which the ISP provides data may depend on the amount of data to be transmitted, the number of channels on which the data is to be transmitted, and the frequency at which one wishes to supply the data to the subscriber terminal. The two scramblers 44 and 46 in FIG. 2 are for example only. Scramblers 44 and 46 place data in-band for transmission to subscribers, along with scrambling an associated television signal. The EPG data and text data in a preferred embodiment are placed in the vertical blanking interval, for example, the data may be placed anywhere in the 6 mega-Hertz channel of an NTSC television signal except at lines 4, 5, and 6, and the vertical sync pulse. For example, the data could be amplitude modulated on the sound carrier (in-band audio). Moreover, the data could be transmitted in a separate out-of-band channel (not shown) via outband data transmitter 54. While an NTSC (U.S. standard) television signal is described by way of example in this description, the signal may be a PAL, SECAM, a digital video compressed signal, or a high definition signal having a wider bandwidth, either analog or digital in nature. Additional information concerning ways to transmit the data may be obtained from U.S. patent application Ser. No. 07/983,766, entitled "In-Band/Out-of-Band Data Transmission Method and Apparatus for a Television System", filed Dec. 1, 1992 and incorporated herein by reference.

The EPG data received by satellite receiver 40 will often be very extensive, containing data for programs up to one or two weeks in advance. If all this data is to be transmitted to subscriber terminal 14, the terminal must be able to store the data in its memory. To store that much information requires a significant amount of memory which would greatly increase terminal costs. Thus, ISP 42 can select portions of the data to be transmitted to subscribers. ISP 42 receives the EPG data, selects the portion to be transmitted to subscribers and passes that portion to a scrambler, e.g. scrambler 44 and/or 46. Not only may ISP 42 select portions of the EPG data, but it may also add data on local stations not covered by EPG data provider 16. ISP 42 may also reformat the data in such a way as to make it more pleasing to the subscribers.

The EPG data is most conveniently tagged as short term or long term, for example, to scramblers 44, 46. Scramblers 44, 46 send more immediate data, for example, the next several hours of EPG data, more frequently (at a higher repetition rate) than long term data. For this purpose, scramblers 44, and 46 are provided dynamic random access memory, for example, at 356 kbytes, 512 kbytes, or even 1 megabyte for temporary storage of data for transmission.

As discussed above, ISP 42 may also obtain text data from an information service provider, such as a stock quote service, or generate text data locally. The text data may originate from many different information service providers and arrive at the ISP 42 via many different media, including satellite, dial up modem, direct connect modem, direct connect to the system manager 10, or by other known means. The text data may either be transmitted as received or may be reformatted by ISP 42, then transmitted to a scrambler (44 or 46) for transmission to subscribers as described above.

A plurality of program sources, one of which is shown as program source 60, supplies television signals to headend 12 via satellite receiver 62 as shown, or by other means such as local broadcast, microwave, coaxial cable, optical fibers, telecommunication apparatus, etc. or a combination thereof. ISP 42 passes data to HEC 28, which controls scramblers 48, 50 and 52, and also outband data transmitter 54. The transmission of data from ISP 42 to HEC 28 may follow the RS-232C communication protocol, but is not limited in this respect. The transmission of data from HEC 28 to scramblers 48, 50 and 52, and outband data transmitter 54 may follow the RS-485 communication protocol, but is not limited in this respect. The scramblers 48, 50 and 52 scramble television signals and may also insert in-band data. Moreover, like scramblers 44 and 46, scramblers 48, 50, and 52 may contain dynamic random access memory for temporary storage of data for transmission. Scramblers 44, 46, 48, 50, and 52 may be Scientific—Atlanta Model 8656-SSU/SEU scramblers. Also data may be transmitted on non-scrambled channels via a data repeater (not shown) such as a Scientific-Atlanta Model 8556-100 data repeater.

The outband data transmitter 54 transmits data on a separate carrier, i.e., not within a 6 mega-Hertz channel, for example, at 108.2 MHZ. Outband transmitter 54 may be a Scientific-Atlanta Model 8653-SU addressable transmitter (ATX) for transmitting global, group, or specifically addressed subscriber transactions. The ATX is capable, for example, of transmitting any one of a plurality of input data rates up to 9600 baud via bi-phase code frequency shift keying modulation.

The transmitted data may be, for example, descrambling information. In a preferred embodiment, data is inserted in each vertical blanking interval to indicate the type of scrambling employed in the next video field. Further, authorization information could be transmitted; this information would authorize the reception of channels or programs globally, or to specific groups or individual subscribers. Some of the information transmitted would be global, i.e., every subscriber would get it. For example, the descrambling information could be a global transmission. Note that just because each subscriber receives the descrambling information does not mean that each subscriber terminal can descramble the received signal. Rather, only authorized subscriber terminals would actually be capable of descrambling a received signal.

On the other hand, data transmissions may be addressed transmissions. Authorization data would normally be addressed to individual subscribers. That is, when transmitted, the data will have an address (for example, a subscriber terminal serial number, a group identifier or a global address) associated with it. The subscriber terminal addressed will receive the data and respond accordingly. Non-addressed subscriber terminals will ignore the data. The outputs of scramblers 44, 46, 48, 50, 52 and outband data transmitter 54 are passed to any necessary processing equipment, such as signal processors, modulators and combiners. These elements are generally indicated as block 56 and do not form a part of the instant invention. The distribution system 58 leads to a subscriber location 70.

At the subscriber location 70, terminal 14 is found. In FIG. 1, for example only, one subscriber terminal is shown. Typically, at a given location only one terminal will be found. However, two terminals may be used in the same system as discussed in greater detail below, for example, to accommodate several televisions 20. At the subscriber location, subscriber terminal 14 is connected to the subscriber's video equipment, including, for example, a VCR 18 and television 20, for example, in one room.

Figure 2B:
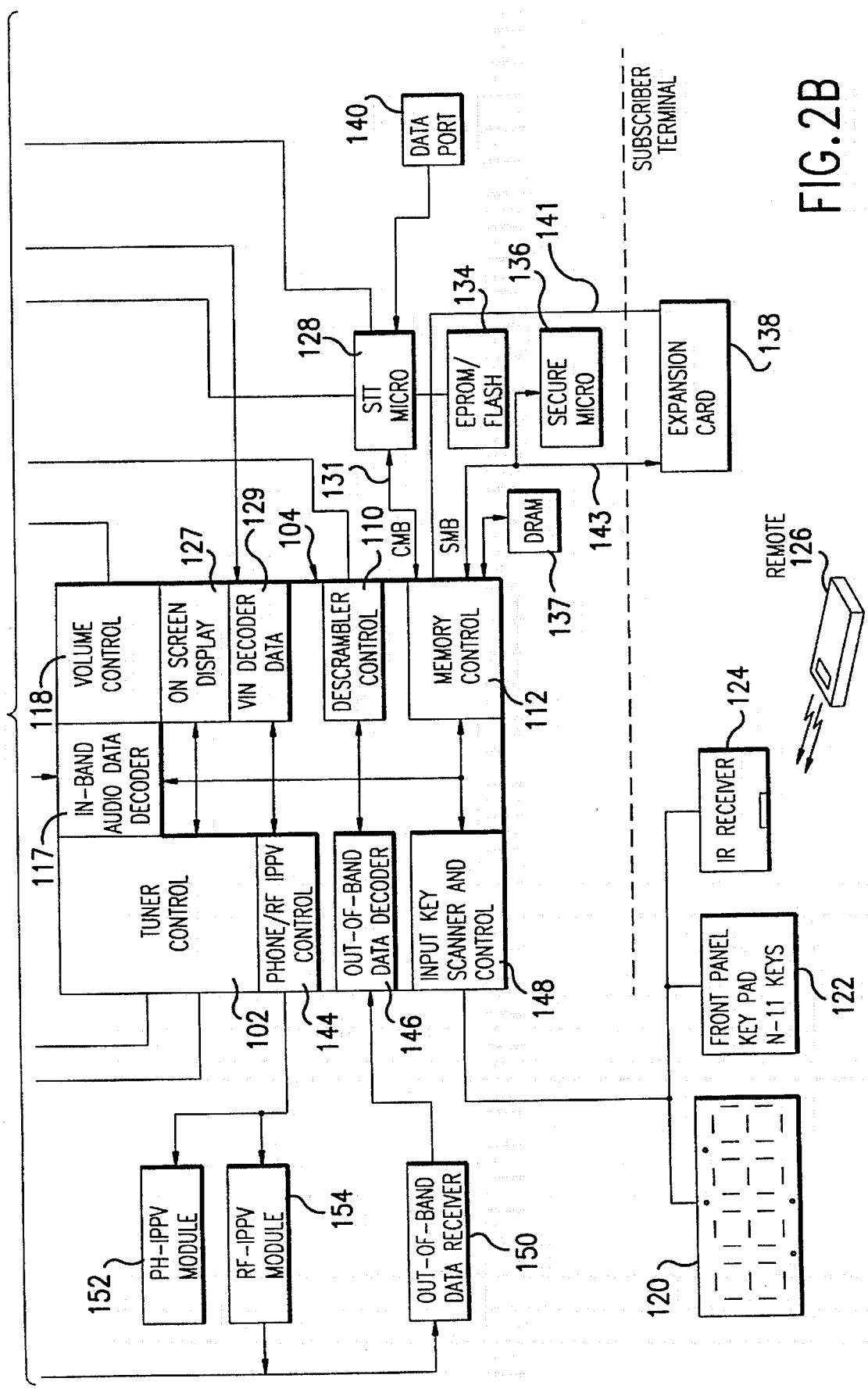
FIG. 2, comprising FIGS. 2A and 2B connected as shown, is a detailed block schematic diagram of one of the subscriber terminals 14 of FIG. 1.

Referring to FIGS. 2A and 2B, a detailed block diagram of one of the subscriber terminals will now be described. The broadband television signal (RF INPUT) which may comprise hundreds of television channels is received from the signal distribution system 58 and input to the up/down converter or tuner 100 (FIG. 2A). To provide picture-in-picture, or watch/record features, multiple tuners 100 (not shown) may be provided for tuning more than one television channel simultaneously. Referring to FIG. 2B, an out-of-band data receiver 150 is also coupled to the broadband input for receiving data transactions from outband data transmitter 54 (FIG. 1). Conventionally, the up/down converter 100 may include an input filter, such as a diplexer, to separate the out-of-band signal and the broadband television signal. The up/down converter 100 can be tuned to a predetermined data-carrying channel for receiving in-band video and audio data when not used by the subscriber for recording or viewing a selected television channel. The channel may be predetermined from the system manager 22 and, by one of the data transmission methods described herein. The predetermined data-carrying channel identification can be pre-stored or downloaded and stored in the subscriber terminal 14.

When in use, the up/down converter 100 is tuned according to a channel selected by a subscriber via a user interface having an infrared (IR) receiver 124, remote control 126 or via terminal keypad 122. Up/down converter 100 uses a phase locked loop under the control of a tuning control 102 to convert the selected or predetermined default RF channel signal to an intermediate frequency signal, for example 45.75 mega-Hertz. A multifunction control circuit (MCC) 104 is linked to up/down converter 100 by a bidirectional link to the tuner control 102. The MCC 104 is preferably an application specific integrated circuit (ASIC) combining many subscriber terminal control and data handling functions into a single package. Of course, the ASIC may include any combination of individual control circuits. Alternatively or in addition, other control circuitry may be used, for example a microprocessor.

The bidirectional link may include one path for tuning and a return path for feedback control of the tuning process. A feedback signal for automatic gain control and one for automatic frequency control are transmitted to the up/down converter 100 through filters 101, 103, respectively from a video demodulator 109.

A filter, for example a SAW filter 106, filters the IF channel signal to split the signal into separate video and audio portions for processing. The video portion is demodulated and descrambled by the video demodulator and descrambler, sync/restore circuit 109 under the control of the descrambler control 110 of the MCC 104. For example, the video demodulator and descrambler 109 may perform sync restoration (one form of descrambling of the video signal) for sync suppression scrambling. The video signal then passes through a bandpass filter 130 to an on-screen display control 132 where inverse video inversion (a second form of descrambling) takes place, if necessary and if programmed. The descrambling of the video portion, whether sync suppression, sync inversion, video line inversion, etc., is under the control of the descrambler control 110 of the MCC 104. The descrambler control 110 provides the necessary timing signals, inversion axis levels, and whether the video is inverted or not to the on-screen display control 132 and supplies the necessary timing, restoration levels, and identification sync pulses to be restored to the video demodulator and descrambler 109. The descrambler control 110 receives such descrambling information either from pulses as in-band audio data, from data modulated on the video during the vertical blanking interval, or via out-of-band means.

In the other path, the audio signal is converted from the IF carrier to an intermodulation frequency, for example 4.5 mega-Hertz, by a synchronous detector 105. Feedback for automatic gain control of detector 105 is supplied from the output of bandpass filter 161. The audio signal may then be demodulated by an FM demodulator 119. An amplitude modulation detector 111 performs pulse detection to recover the in-band audio data which are amplitude modulated onto the audio carrier. The received in-band pulses are supplied to an in-band audio data decoder 117 of MCC 104 for processing after being shaped by pulse shaper 115. The in-band data, except for descrambling data, is stored in DRAM 137 for buffering. Descrambler control 110 accesses descrambling data directly for the video descrambling operation.

Volume control of the audio signal is performed under control of a volume control 41 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI detector. The in-band video data is transmitted at a frequency on the order of known teletext systems, such as 4.0 megabits per second. However, the invention should not be considered limited in this respect. A data clock provides an appropriate sampling frequency higher than the Nyquist rate according to well known techniques. The VBI data decoder 129 stores the data in DRAM 137 prior to processing by the microprocessor.

The on-screen display control 132 selectively generates on-screen character and graphics displays in place of or overlaid on the video signal. For example, the information stored in DRAM 137 by the VBI data decoder 129 may be read out to the on-screen display control and used to generate on-screen characters and/or graphics. The modulator 142 combines the video signal from the output of the on-screen display control 132 and the audio signal from the output of the mute control circuit 125 and converts the combined signal to the channel frequency selected by the microprocessor 128, such as channel 3/4 for NTSC. The combined and remodulated signal is supplied as an RF output to a television receiver in a well known manner.

A control microprocessor 128 controls the overall operation of the subscriber terminal 14. The subscriber terminal communicates to and controls the microprocessor 128 through interactive user interface with an on-screen display. The user interface includes keyboard 122 on the front panel of the subscriber terminal 14 and the remote control 126 which generates subscriber control signals for channel tuning, volume level control, feature selection, and the like. These subscriber commands are decoded by an input scanner and control 148 of the MCC 104. The remote IR receiver 124 of the user interface receives the commands from the IR or other remote control 126, as is well known in the art, and provides commands to the microprocessor 128. The user interface may additionally include a display 120, for example, a four-digit, seven segment LED display, which displays the tuned channel numbers and diagnostics. The microprocessor 128 also includes an accurate real time of day clock that is periodically refreshed by the headend 12 by globally addressed commands, for example, in accordance with U.S. Pat. No. 4,994,908, which teaches the display of time of day in a CATV system.

When the keypad 122 or remote control 126 is utilized to select a command, the microprocessor 128 operates to execute the command. The subscriber terminal interacts with the subscriber by providing numerous on-screen displays which assist in the operation of the terminal. The on-screen displays provide information and prompts to guide the subscriber through many of the complex features of the terminal. For example, the on-screen display may implement a menu page structure for providing screen-by-screen directions for using the subscriber terminal and its features.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of the MCC 104 carries out descrambling on a particular channel or what form of descrambling is required at a particular time by interpreting the authorization and control data downloaded from the system manager 22 (by any of the three data transmission schemes discussed herein, out-of-band, in-band audio or in-band video) into the internal non-volatile memory (NVM) of the device. The NVM in the secure microprocessor 136 stores secure data, for example, authorization data, scrambled channel data, some terminal configuration data and other required data.

The control processor 128 operates by running a control program which preferably is partially stored in a read-only memory internal to the processor and partially stored in an NVM, such as Flash EPROM memory 134. In addition, the control program of the microprocessor 128 may also reside in the NVM of an expansion card 138. The microprocessor 128 communicates with the NVM 134, 138 via a memory bus 141 which has data, address, and control lines. The microprocessor 128 also controls the data decoders 117, 129 and 146, volume control 41, on-screen display control 132, and the tuner control 102, descrambler control 110 and input key scanner and control 148 via commands through MCC 104 and control processor bus (CMB) 131. The microprocessor 128 directly controls the mute switch 125 and the output frequency selection of the modulator 142. The microprocessor 128 includes additional capacity for other auxiliary device communications and control through a data port 140. For example, the data port may accommodate an IR blaster for VCR control via an on-screen menu, an additional subscriber terminal for dual tuner operation, or connection to a digital video subscriber terminal.

The subscriber terminal 14 may receive addressable and global data, other text data, and descrambler data transmitted from the headend 12 via the in-band vertical blanking interval (VBI). Alternatively or in addition, addressable and global data may be transmitted in a separate out-of-band data carrier if an out-of-band receiver is provided. The memory control 112 permits data coming from the three data decoders 117, 129, and 146 to be placed in a volatile memory, for example DRAM 137. There it can be accessed by the control microprocessor 128 via the CMB 131. Additional details are discussed below. The MCC 104 also distributes control instructions from the control microprocessor 128 to other parts of the MCC 104 to provide operation of the rest of subscriber terminal 14. The MCC 104 additionally connects to a secure microprocessor bus (SMB) 143 which permits communications between the secure microprocessor 136 and other portions of the subscriber terminal 14. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests from the microprocessors 128, 136 and other controls and data decoders to write to memory or read from memory. It resolves contentions for memory transfers, giving priority to real time applications and the microprocessors, and schedules the data flow. The microprocessors 128, 136 communicate through internal registers of the MCC 104 with the memory control 112 and other portions of the MCC 104.

The expansion card 138 may be a printed card which contains memory and/or secure microprocessor components, which can be plugged into a connector 200. The connector 200 can be configured such that, when it receives the expansion card 138, the expansion card is flush with top cover. The connector 200 electrically extends the control microprocessor memory bus 141 and the secure microprocessor bus 143 to the expansion card 138. Additional program or data memory, renewed security, or any other application supported by microprocessors 128, 136 can be provided by the expansion card 138. In addition, circuitry coupled to microprocessor 126 may be provided for detecting whether or not the expansion card is installed. Thus, the subscriber terminal 14 may be controlled in accordance with information contained on the expansion card 138 when installed and in accordance with internal software when the expansion card 138 is not installed. Additional details concerning the expansion card 138 may be obtained from U.S. patent application Ser. No. 07/983,910, entitled "Subscriber Terminal with Plug In Expansion Card", which is incorporated herein by reference.

The VBI data decoder 129 performs two main functions. The first function is to process all scrambled transactions that are sent to the subscriber terminal. Processing a transaction includes digital filtering, error detection, error correction, decryption and storage of the data. The second function is to determine the fine number and field number of the video. The line and field numbers are used by other components of the subscriber terminal, such as the descrambler control 110 and the on-screen display control 132.

The control and secure microprocessor interface 310 provides connection between the registers for the VBI decoder 129 and control microprocessor 128 and secure microprocessor 136. The control microprocessor 128 interfaces with the VBI decoder 129 to control operations thereof. The secure microprocessor 136 provides the VBI decoder 129 with information required to perform descrambling and information recognition functions. For example, the secure microprocessor 126 may provide a present encryption seed, the next encryption seed, and the subscriber terminal address. Additional details of the VBI decoder are discussed in application Ser. No. 08/229,805, entitled "Subscription Television System and Terminal For Enabling Simultaneous Display of Multiple Services", filed Apr. 19, 1993 and incorporated herein by reference.

Figure 3:
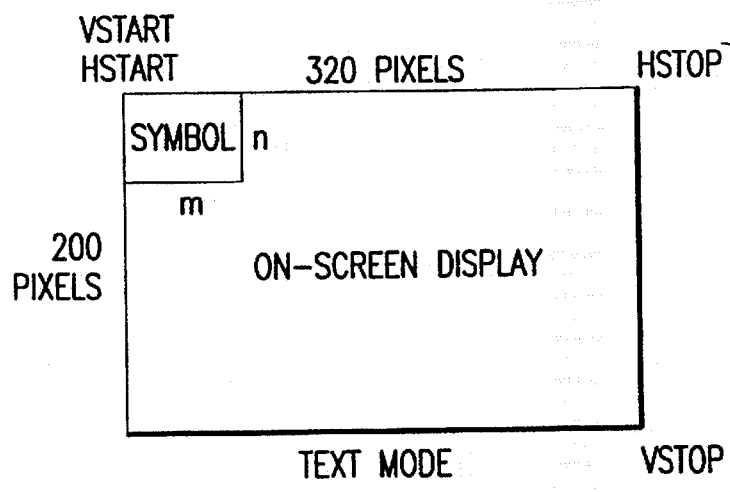
FIGS. 3–7 are a pictorial representation of the different modes of the on screen display system of the subscriber terminal illustrated in FIG. 2.

Referring to FIG. 3, a brief description of the on-screen display will now be provided. As noted above, the on-screen display is implemented from the on-screen display control 132. The screen may include for example 16 lines with either 45 characters per line, 24 characters per line, or a combination of both. The cubes used to display text can vary in size. In a preferred embodiment, the size of the cubes preferably conforms to one of the following inequalities:

(height×width)/2<256 or (height n×width m<510) for even m and m+1 for odd m)

In this case, there is a minimum of seven pixels and a maximum of thirty-one or thirty-two pixels for the width of the cube. There is a minimum of six pixels and a maximum of sixty-three or sixty-four pixels for the height of each cube. Underlining can be activated and deactivated on a per-cube basis as the bottom line of the cube. The background display may take, for example, any of 4096 different colors, including transparent. Characters or graphics overlaid onto active video may be surrounded by a block of black background to enable easy distinction from the video. Additional details of the on-screen display control may be obtained from U.S. patent application Ser. No. 08/073,404, entitled "Display System for Subscriber Terminal", filed Jun. 7, 1993 and which is incorporated herein by reference.

The subscriber terminal is capable of accessing a wide variety of information using text channels, EPG, interactive templates, and messages which are transmitted as data from the headend 12 to the subscriber terminal 14 in, for example, the vertical blanking interval of the video portion, modulated on the audio carrier, or via outband transmission. A further understanding of the techniques by which data may be transmitted from the headend 12 to the subscriber terminal 14 can be obtained from U.S. patent application Ser. No. 07/983,766, entitled "In-Band/Out-of-Band Data Transmission Method and Apparatus for a Television System", filed on Dec. 1, 1992 and which is incorporated herein by reference. Additional details of the techniques by which EPG data is transmitted from the headend 12 to the subscriber terminal 14 may be obtained from U.S. application Ser. No. 230,144, entitled "Pay-Per-View Electronic Programming Guide", filed Apr. 19, 1994 and incorporated herein by reference.

In a single tuner embodiment, multiple data streams may be selected by the user for display. In a two or more tuner embodiment, multiple video channels and data streams may be displayed. Moreover, multiple video channels may be combined at a headend for transmission. Additional details of displaying multiple video channels, text channels and the messaging capabilities of the subscriber terminal may be obtained from U.S. application Ser. No. 08/229,805, entitled "Subscription Television System and Terminal For Enabling Simultaneous Display of Multiple Services", filed Apr. 19, 1994.

The subscriber terminal 14 includes an impulse-pay-per-view (IPPV) module for transmitting return path information from the subscriber terminal 14 to HEC 28 and/or to the system manager 22 of the central control center 10. The IPPV module can be one or both of the telephone type 252 and the RF-IPPV type 154. Such return path information of the RF-IPPV type may be transmitted via a coaxial cable, an optical link, or other known means.

The return path information may include billing data related to IPPV services. As described above, subscriber terminal 14 can either transmit billing data over a telephone line directly to the phone processor 30 or back up the cable to RF IPPV processor 34. If the data is sent to RF IPPV processor 34, it is sent by modem 36 associated with RF IPPV processor 34 to modem 32 associated with system manager 22. System manager 22 accumulates the billing data from phone processor 30 and modem 32 and provides it to billing computer 24 so that customers may be billed for their program services. The IPPV module also allows subscribers to request authorization of their subscriber terminal to receive pay events such as pay-per-view events or near-video-on-demand (NVOD) transactions, store the data associated with the purchase of the event in the NVM of the secure microprocessor 136, and then transmit the data to the system manager 22 via the telephone return path or the RF return path via the signal distribution system.

The on screen display system will now be more fully described beginning with reference to FIGS. 3–10. In FIG. 3, each on screen display can be generated as an array of pixels having up to 320 vertical columns and 200 horizontal rows. The 200×320 pixel size is chosen to generate adequate resolution for a standard NTSC receiver. Of course, other video formats, such as the several PAL formats, high definition video formats and the like, can be supported by adding additional pixels and fines. Additionally, different sized pixels forming other display areas can be provided for any television signal format. Each on-screen display is generated by the display controller 127 (FIG. 2B) by producing analog pixels for the horizontal scan lines of the screen of the television receiver of the subscriber. The display controller 127, under the command of the control processor 128, controls the time of such display and which display to produce on the screen of a receiver. For example, the custom logo and caption screen of a system operator may appear when the terminal 14 is actuated and remained displayed on associated television 20 until a key of keyboard 122 or remote control 126 is activated by a user.

The on screen display processor 127 operates on a video field by video field basis. A display screen is formed from display attributes and stored display data describing the screen or field in terms of pixels. This field can then be displayed in a noninterlaced form for nonvideo purposes or mixed in an interlaced form with active video. The field can be displayed many times to produce a static display, or the display parameters and display data can be changed to produce varying images. In either case, the on-screen display is activated by a command from the control processor 128 and will continue to display a screen which is stored in the display memory until disabled by the control processor. This produces a particularly advantageous system when the control processor 128 and display processor 127 can operate in parallel without completely monopolizing control processor resources.

In this display environment, three types of display modes can be produced including a text or symbol screen mode, a graphics screen mode, and a combination mode where text and graphics screens can be displayed together. In addition, any of these modes can be used in combination with a border screen mode.

In the text or symbol screen mode, as seen in FIG. 3, the on-screen display is defined as a plurality of symbols, each symbol being of a variable pixel array of size m×n, where m=6, 7 ... 16; n=6,7 ... 32 and m×n<512. By providing a variable size of symbol, many different types of symbol sets and sizes, such as different character fonts can be realized. Additionally, different foreign language character sets such as Japanese, Arabic, Chinese or others can be easily realized in this manner. A text screen can encompass the entire display array or be any size down to one symbol. Each text screen is defined by a vertical start and stopping point VSTART, VSTOP, and a horizontal starting and stopping point HSTART, HSTOP.

A preferred example for an English character set would be an 8×12 pixel array which would yield a maximum of 16 symbol lines on a text screen display with 40 characters per line. Another preferred example for a Chinese character set would be a 12×12 pixel array which would yield a maximum of 11 symbol lines on a text screen display with 26 characters per line. A plurality of these symbol arrays, each defining a particular character in a character set, are grouped in the display memory to form symbol set definitions, such as English, Chinese, font A, font B, etc. It is evident that the subscriber terminal 40 may store multiple symbol set definitions.

Figure 9:
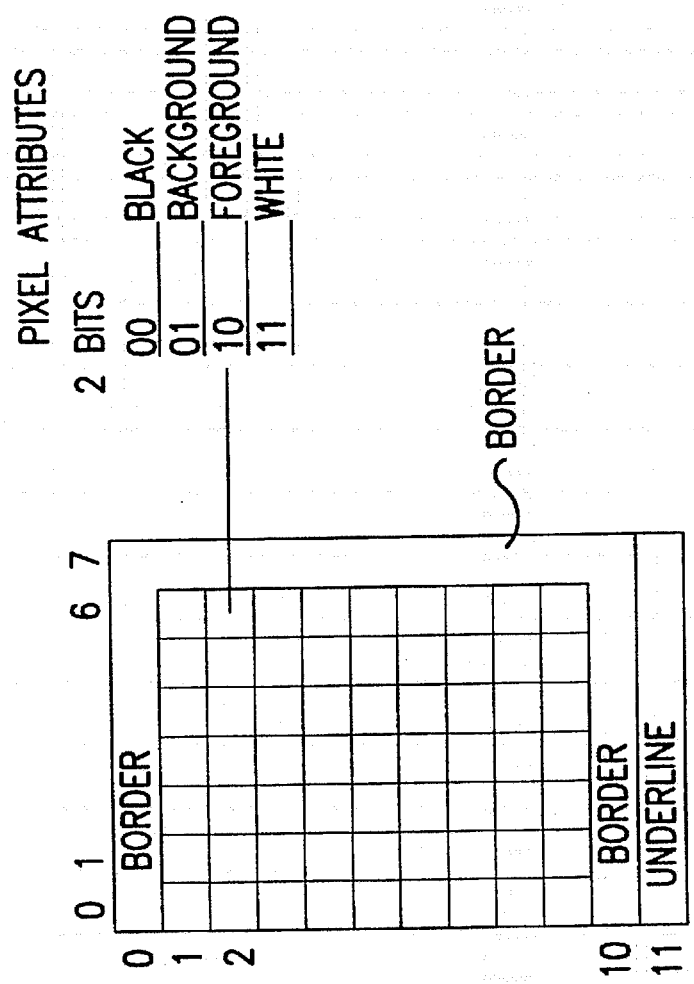
FIG. 9 is a pictorial representation of a generic symbol of the symbol set definition area of the display memory.

An example of a character from an English character set, a 8×12 pixel array, is illustrated in FIG. 9. The character has a 1×8 pixel underline and a 1 pixel wide border around a 7×9 pixel character field. The character is defined by selecting pixels from the character field in a particular pattern. Each pixel of a symbol definition is stored as a 2 bit pixel attribute field which describes one of the four possibilities shown in the table of the figure. Each pixel can be either a foreground pixel, a background pixel, a black pixel or a white pixel.

To build a text screen display, a plurality of symbol pointers (each addressing a selected symbol in a symbol set definition) is stored in the sequence which the characters are to be displayed. For example, if the word LIST is to be displayed on the screen, then successively, the symbol pointers for the English character set elements L, I, S, T would be concatenated. The pointers may further contain symbol attributes for each character as is shown in the example for FIG. 8.

The illustration shows a symbol pointer as a 16 bit word which has a 7 bit symbol attribute field and a 9 bit symbol address. The 7 bit attribute field contains a 4 bit field defining the color of a character. These four bits may select one of sixteen colors of a color pallet register stored for that purpose. The other three symbol attribute bits include one bit to determine whether the character is to blink, another bit to determine whether the character should be underlined, and a foreground mode bit for special effects for the character.

Figure 4:
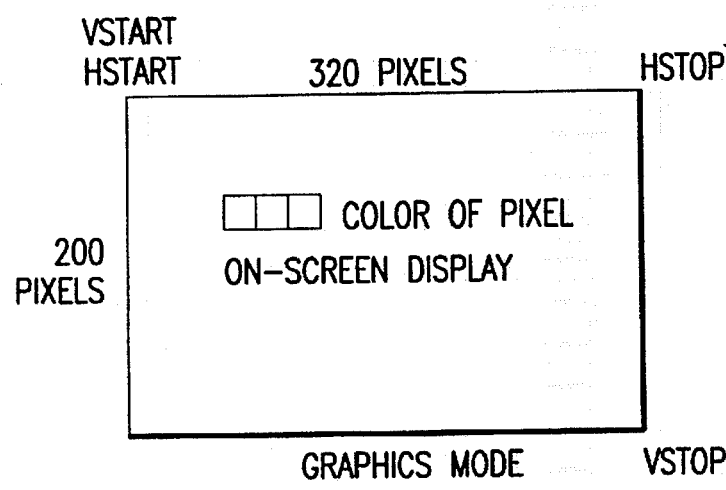

In the graphics screen mode, the display system utilizes the entire 300×200 pixel display as a pixel mapped graphic as seen in FIG. 4. Each pixel can be displayed as one of sixteen colors of the foreground or background color pallet memory. In the graphics mode, the color is then selected by 4-bits stored for each pixel.

Figure 5:
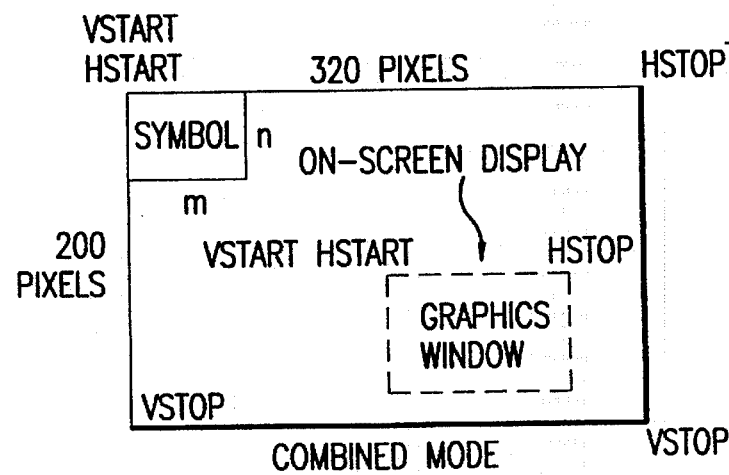
Figure 6:
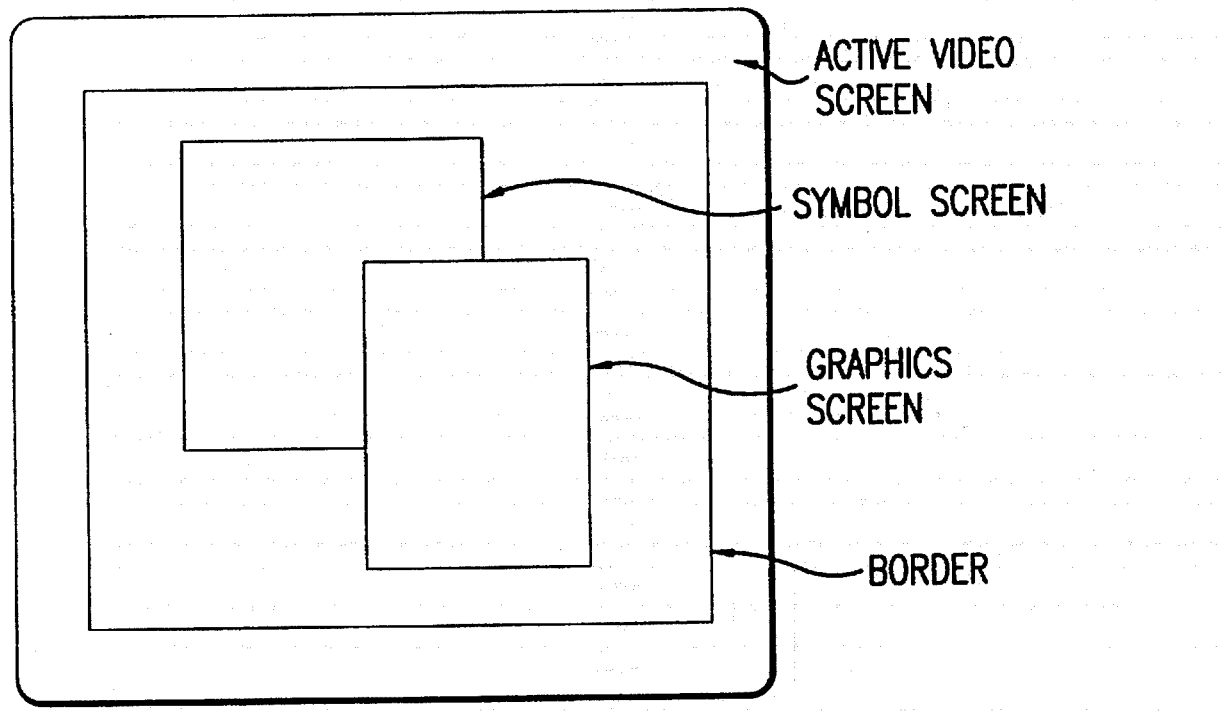
Figure 7:
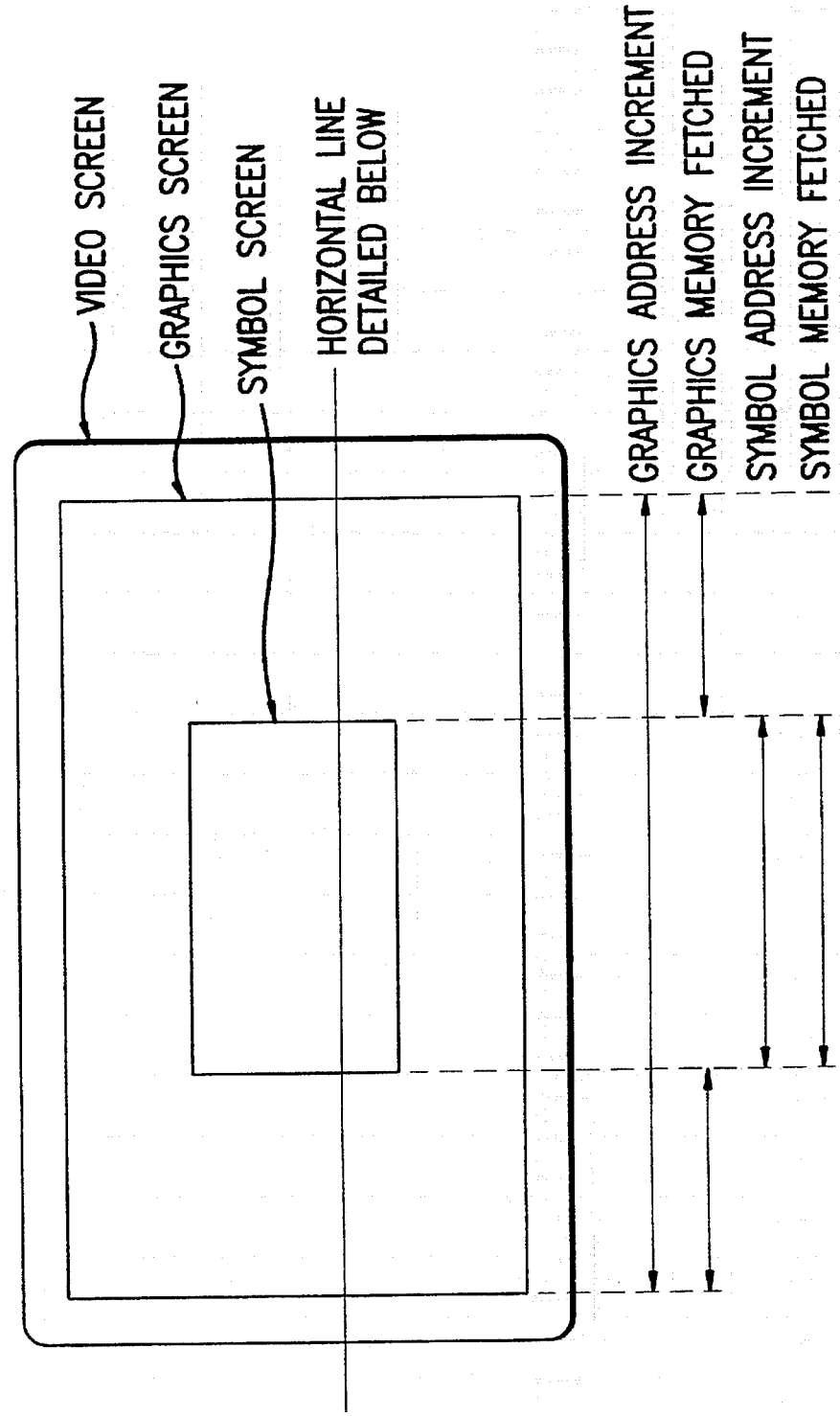
Figure 8:
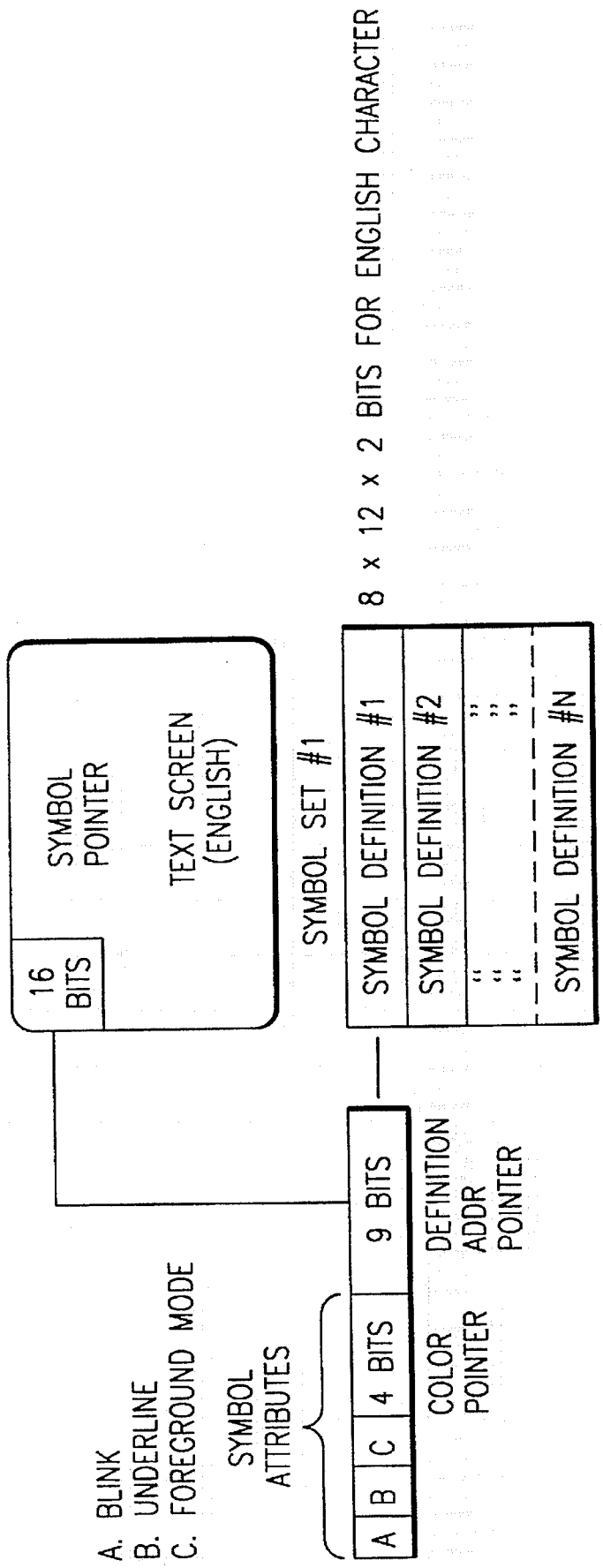
FIG. 8 is a pictorial representation of a pointer of the symbol screen definition section of the display memory.

For the combination mode as seen in FIG. 5, both the symbol screen mode and the graphics screen modes are used simultaneously. A graphics screen of less than the full screen is defined and displayed in the normal graphics mode. This display can then be overlapped with a text mode display which does not display in the graphics window area. The reverse is also provided where a text screen can be overlaid on a graphics screen.

The display processor also includes a border screen feature where a border screen of a particular color may be placed around the graphics or symbol screens. The border feature is shown in exemplary form in FIG. 6 where the border pixels are active whenever the graphics screen and symbol screen are inactive and the border screen is enabled.

The color of the border screen is produced by loading a 12 bit color value in a border screen parameters register. The location of the border is set by loading the horizontal starting and ending locations, and the vertical starting and ending locations on the screen. The border screen may be disabled by storing a vertical start number which is larger than the maximum number of lines on a screen.

The display controller receives a number of display parameters which it loads into its control registers to regulate processing of the display function. The first set of display parameters is the screens heights and widths which can be at a maximum the full screen of a 320×200 pixel array and, if less than the full display area, the display screens locations. All those screens which will be active in the display area will have these parameters stored for them. The second set of parameters is a symbol set dimension n×m defining one of the symbol definition sets. As will be more fully discussed, multiple symbol definition sets can be stored and displayed in one screen.

The display system provides an extremely powerful and flexible tool for producing on screen displays for the subscriber terminal 14. The display system can be used in a text only or a full pixel mapped graphics mode only. The display can be a combination of text with a variably sized and variably positioned graphics window which itself is fully pixel mapped. The screens may be full sized or any smaller defined size.

For a character or graphics display, thirty-two colors can be programmed for a character or pixels. The color palette registers may be changed to display 16 choices for foreground and 16 choices for background from a 4096 choice color palette. On a per line basis a character set can be changed. On a per character basis selections for background and foreground color are available. Moreover, characters may take on border, underline, blink and highlight features on a selectable basis.

The display system provides a color palette of approximately 4096 colors which are defined as 12-bit digital words having a 4-bit luminance component, a 4-bit B-Y (blue-luminance) chrominance component, and a 4-bit R-Y (red-luminance) chrominance component. Combinations of these bits allow a user to select a wide variety of colors. Of course not all 4096 combinations of 12 bits will define useful colors, but there are a great number of useful hues and tints available.

Figure 10:
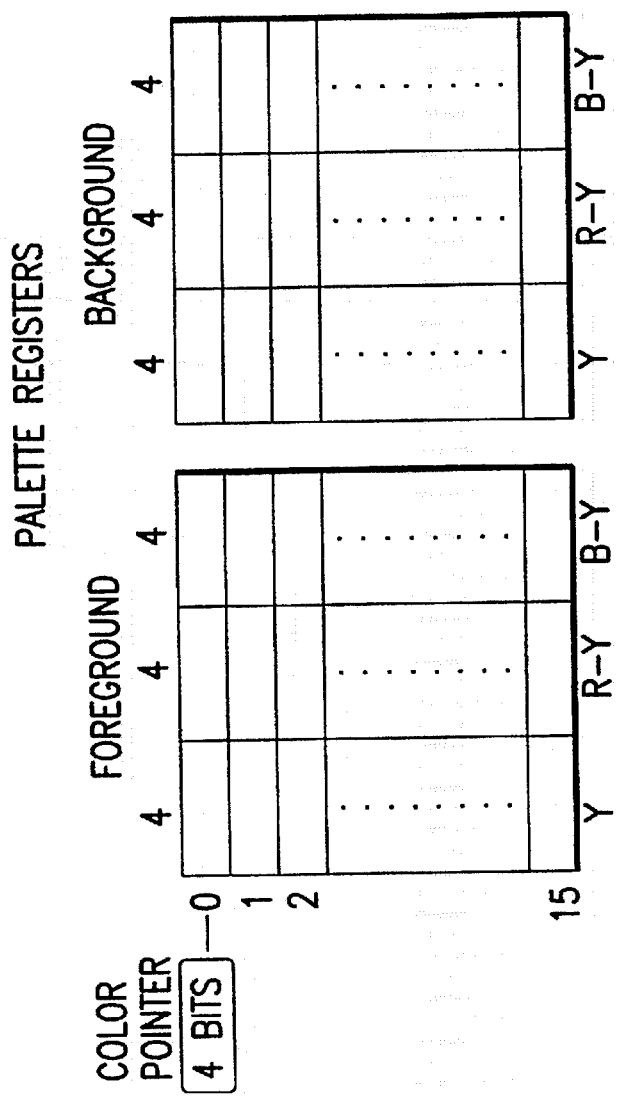
FIG. 10 is a pictorial representation of the palette registers used in the color selection for symbol.

The digital processor contains a plurality of palette registers as shown in FIG. 10 into which these colors can be stored. Any thirty-two of the colors can be stored at one time, as there are sixteen background color registers and sixteen foreground color registers. The system uses a 4-bit pointer to select one out of the sixteen colors for both foreground and background by pairing the registers. This feature is useful in providing a plurality of letters of one chosen color on a chosen background color, for example, blue letters on a white background. This configuration can be programmed easily by the same color pointer for all letters indicating a palette register pair having a blue color loaded into the foreground register and a white color loaded into the background register.

Figure 11:
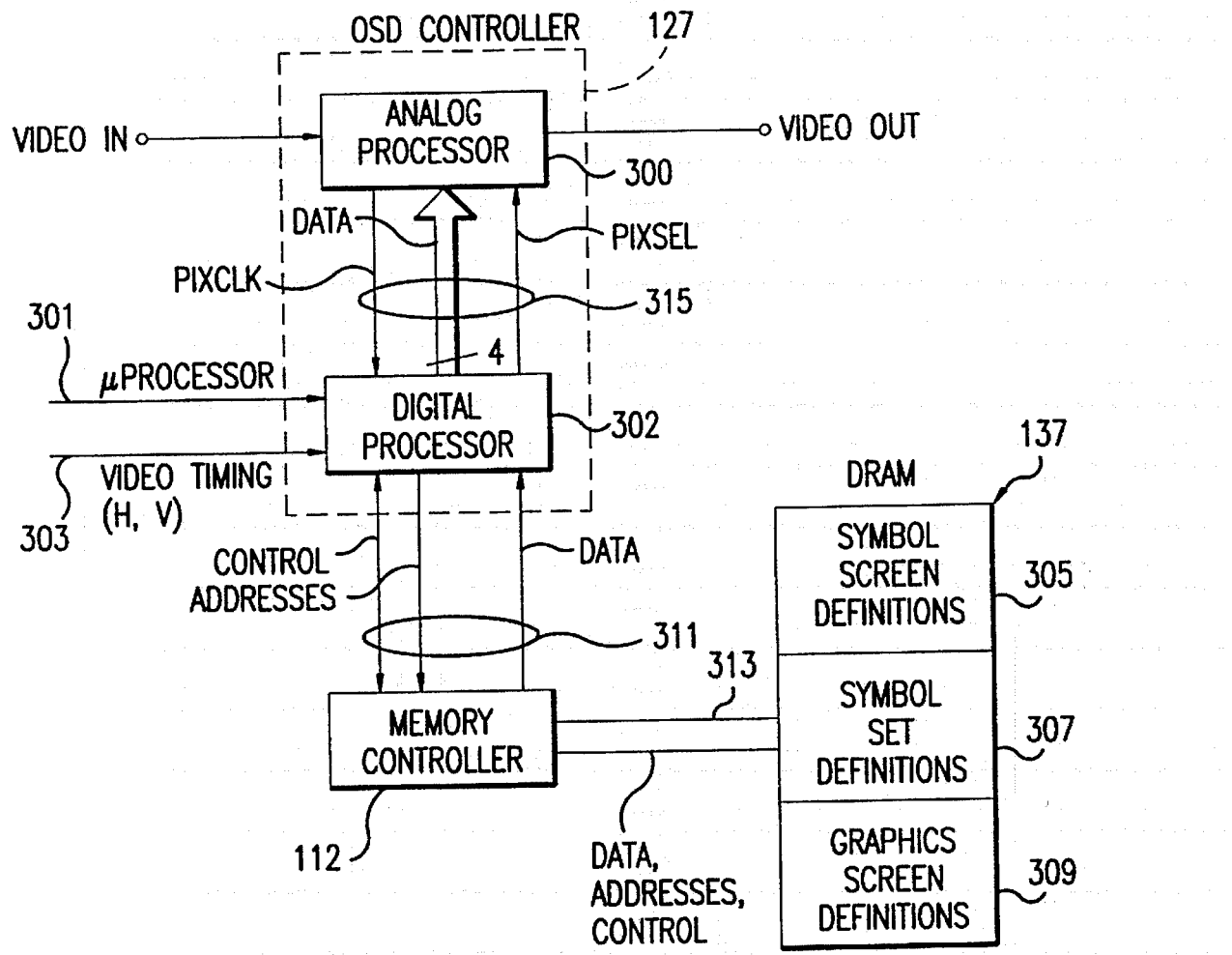
FIG. 11 is a functional block diagram of the display controller illustrated in FIG. 2 and a pictorial representation of the display memory partitioned into a symbol screen definitions section, a symbol set definitions section, and a graphics screen definitions section.

A system block diagram of the on screen display controller 127 is more fully illustrated on FIG. 11. The on screen display controller 127 operates under commands from the control microprocessor 128 to provide on-screen displays for the subscriber terminal in the form of text screens, graphics screens, or combinations of text and graphics screens. The on screen display controller 127 comprises a two part display processor including an analog processor 300 and a digital processor 302.

The digital processor 302 receives commands and configuration data from the control microprocessor 128 over a bus 301 and video timing data 303 from the VBI decoder 129 indicating the start of each horizontal line and the start of each vertical field. The digital processor 302 uses the display parameters from the control microprocessor 128 to access display information in the DRAM 137 for the particular on screen display which is to be generated. The on screen display may be only text, and, in that instance, the symbol screen definition portion 305 and symbol set definitions 307 portion of the DRAM 137 are accessed. If the on screen display is only graphics, then the graphics screen definitions portion 309 of the DRAM 137 is accessed. If a combined screen of text and graphics is needed, then all three portions 305, 307, and 309 of the display memory are accessed.

The digital processor 302 accesses information in these portions of display memory on a nybble by nybble basis. Nybbles are preferably stored in DRAM 137 least significant nybble first. It fetches data from the DRAM 137 by its connections to the memory controller 112 through control lines, address lines and data lines 311. The digital processor 302 requests data from the DRAM 137 by providing a calculated starting address, number of memory locations accessed, and control commands to the memory control 112, and the data is returned over the data lines 311 and 313. The digital processor 302 processes this data to convert it into a series of digital words, each indicating the luminance and chrominance values of a pixel for the on screen display. These digital words which represent analog pixels, along with appropriate timing signals, are sent from the digital processor 302 to the analog processor 300 over timing and data lines 315.

Figure 12:
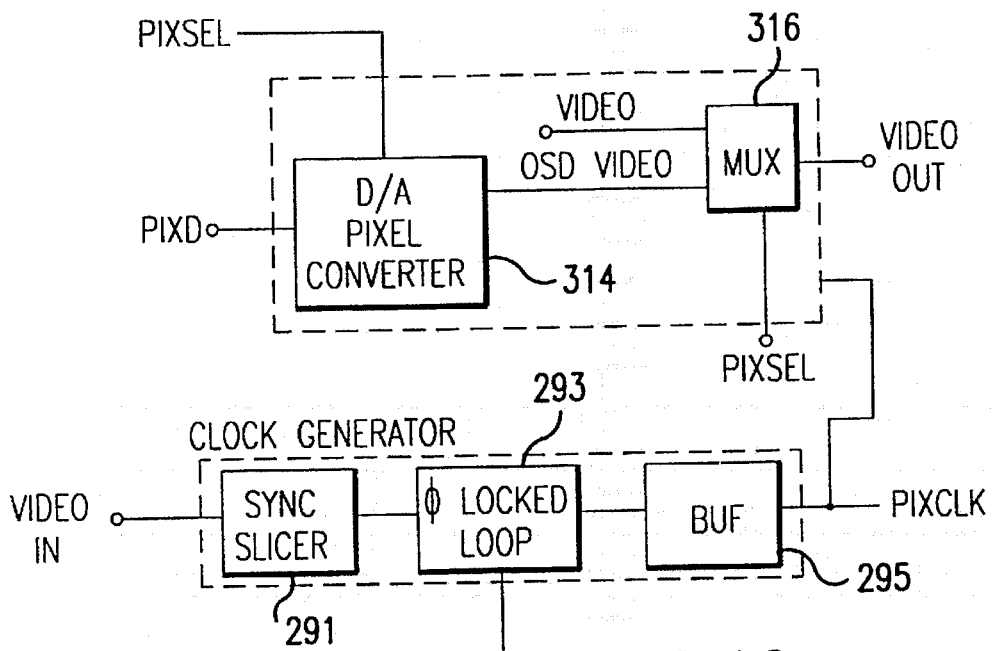
FIG. 12 is a detailed block diagram of the analog processor illustrated in FIG. 11.

As better illustrated in FIG. 12, the analog processor 300 includes a conversion means 314 to convert the digital pixel words to analog pixels. The analog processor 300 also receives the incoming video signal VIDEO IN, after its demodulation, and inputs the signal to one part of an analog multiplexer 316 which can select on a pixel by pixel basis, either analog pixels from the VIDEO IN signals or analog pixels from the digital to analog pixel converter of the analog processor 300. The analog processor 300 selects which pixel to output based on a pixel select signal PIXSEL. The digital processor 302 generates the pixel select signal PIXSEL based upon whether the display processor is enabled and is outputting a valid color definition.

The digital processor 302 causes the pixel select signal PIXSEL to choose the VIDEO IN signal if both of these conditions are not met. The multiplexed output is then output to the modulator 142 as the VIDEO OUT signal. The analog processor 300 further generates the pixel clock signal PIXCLK from an oscillator clock CLK. This is the basic training signal of the display processor and divides a horizontal line with 455 pixels of a duration of approximately 139 nanoseconds each. If the pixel clock is needed for display during a time when no VIDEO IN signal is tuned by the subscriber terminal, then it is generated directly from the oscillator clock signal CLK. This is a so called internal video mode. If the pixel clock is used for a display where the video signal is present, then it is generated by phase synchronization with the horizontal sync of the VIDEO IN signal by a sync slicer 291 and a phase locked loop 293.

Figure 13:
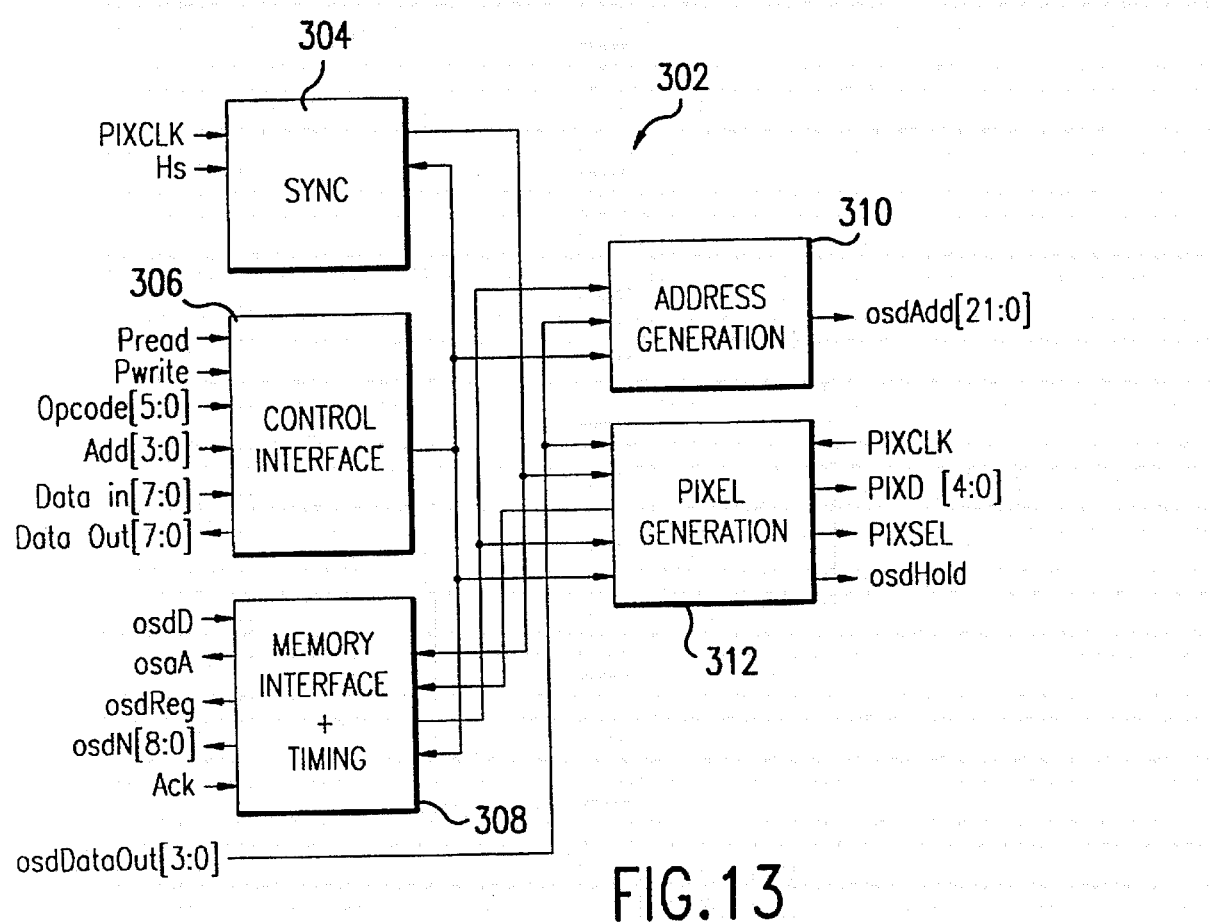
FIG. 13 is a detailed block diagram of the digital processor illustrated in FIG. 11.
Figure 15:
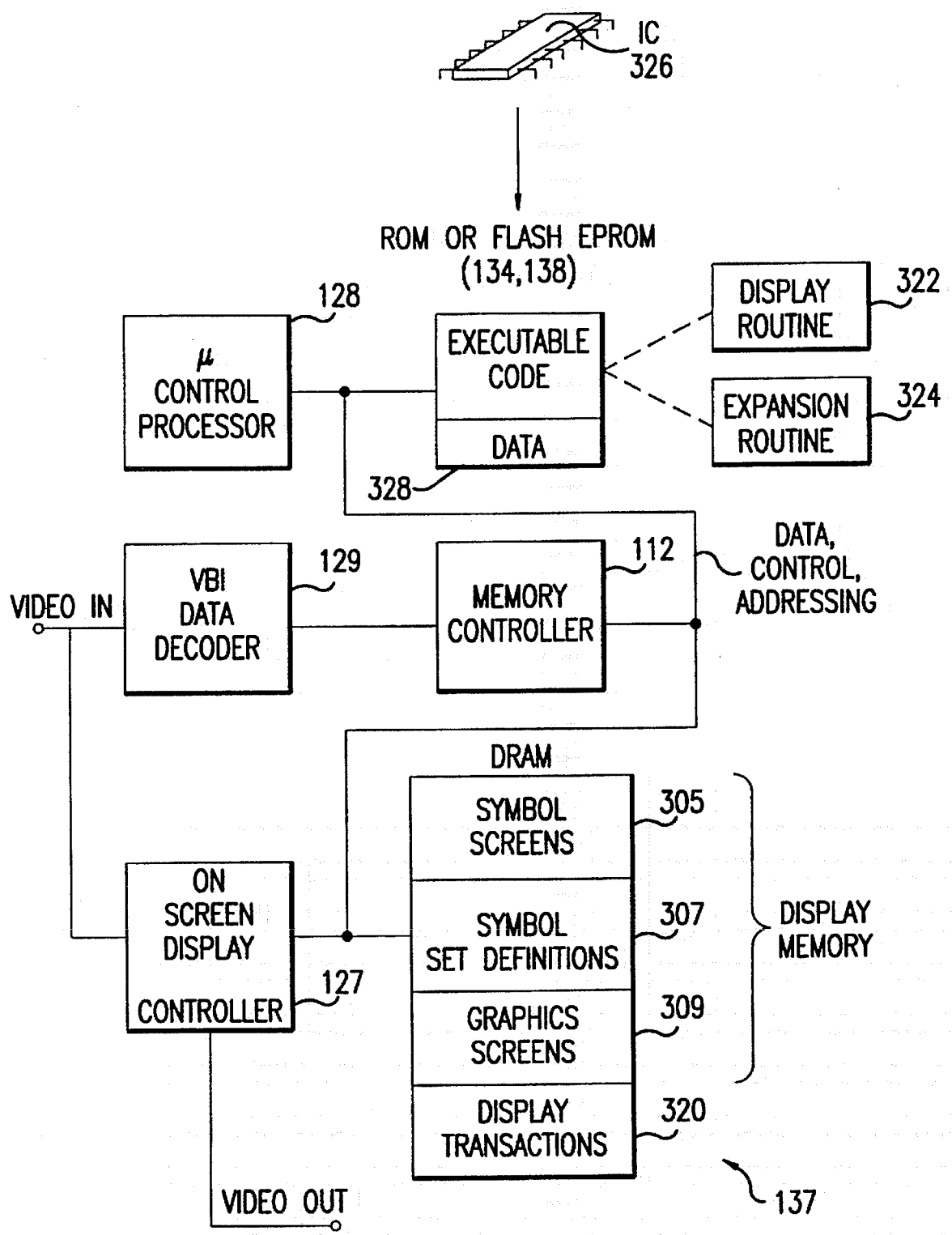
FIG. 15 is a pictorial process flow chart of the communication display transactions and the variation of display data and display attributes in the display system.

The digital processor 302 is controlled by the control processor 128 by reading and writing the registers R1–R12 shown in FIG. 13. The display attributes for the on-screen display can be controlled by loading and reading particular registers in the digital processor 302.

The type of screens which can be displayed and their location on the display area of the television receiver are provided by a border screen parameters register R2, a symbol screen parameters register R4, and a graphics screen parameters register R5. All of the screen registers have information concerning the horizontal starting point (SH) and stopping point (EH) and the vertical starting point (SV) and stopping point (EV) of each of the respective screens.

A symbols screen or graphics screen can also have associated with it the starting memory locations of where the display information is stored in DRAM 137. This information is loaded into the symbols screen base address register R8 for the symbol screen, and the graphics screen base address register R9 for the graphics screen. Because the border screen is generated internally and not stored in the DRAM 137, register R2 also contains a 12 bit digital word describing the color of the border semen. All pixels of the border screen are generated from this color.

To activate the symbol screen, the graphic screen or the border screen, the starting address of the screen must be within the display area limits. Conversely, to deactivate any of the screens, the vertical starting address of a respective screen is set to a line number outside the display area. A control bit CONTR is used in register R2 to enable and disable the function of the screen border.

The colors for a selected pixel of a screen can be chosen by one of the color registers R6, R7 and R10. There are sixteen foreground palette registers and sixteen background palette registers R10, a black color register R6, and a white color register R7. Each of these registers is capable of storing a 12 bit color as described for the palette section, 4 bits of luminanee and 4 bits each of the two phases of chrominance.

There are two sets of registers R11 and R12 which provide control of the symbol line attributes. Each symbol line in a symbol screen display can be of a different font or style which is defined as a symbol set definition in the display system. There are up to sixteen symbol lines, and each of these can have a number of line attributes which are stored in sixteen symbol line attribute registers R11. The first field of a symbol line attribute register is the address of one out of four symbol set definition registers R12. The second field is a one bit line attribute, which selects either the foreground or background color for the underline color. The particular color palette register chosen is then described in a 4-bit field, palette register. Additionally, a special effects bit ULI for inverting the luminanee for the underline is provided where, if the bit is cleared, the luminanee of the underline is provided normally, and if the bit is set, the intensity of the luminanee of the underline is inverted.

The two bit symbol line definition in the line attribute register R11 selects one out of four symbol set definition registers R12. Each symbol set definition register R12 stores the size of a particular symbol set, m×n, the number of nybbles in a symbol, and the symbol definition base address. Registers R12, along with the symbol line attribute registers R11, allow up to four different types of symbol set definitions to be used simultaneously in the display system.

The last two registers that are provided are for control and selection of different functions of the display processor. The first is a video parameter register R1 and the other is a control parameters register R3. The video parameters register R1 defines the control timing of the particular video signal that is to be generated by the display processor. The horizontal sync start time SYNC S and end time SYNC E are stored along with the vertical synchronization start time VSYNC S and end time VSYNC E. Also defined are the color burst start rime CB S and end time CB E. To time the vertical blanking interval, the equalizing pulse start time EP S and end time EP E are also stored in the video parameters register R1.

The control parameters register R3 is a two byte register which stores a number of control bits choosing the modes and features for the display processor. The blink rate BR for symbols and underlines, by way of example, is stored in increments of 0.25 seconds from 0–4 seconds. The blink duty cycle BD, by way of example, can be set with two bits indicating duty cycles of 25%, 50% or 75% on and conversely 75%, 50% or 25% off. The blank screen bit BK can be used to blank a screen, if set to 1, or to display the screen normally, if set to 0. Further, an internal/external selection bit INT is used to determine whether the video signal is to be internally generated, if set to 1, or synchronized to the external video signal, if set to 0.

If the signal is being internally generated and is not being synchronized to an interlaced video signal, then an interlace control bit ILC can be set for non-interlaced fields or cleared for interlaced fields. Two further fields, PALFOR and PAL/NTSC, are used to select either the NTSC or PAL format and, if PAL format, the type of PAL format which is to be selected. Other fields would be utilized as well if other or high definition formats are utilized. The bit GSEL is used to select whether the color palette for graphics is the foreground palette or the background palette. The control bit EN is used to enable the on screen display controller or disable the on screen display controller. The underline blinking bit UNB indicates whether the underline of a symbol will blink or not blink. Four bits for an upper address field UA are used to allow the digital processor 300 to extend the size of DRAM 137 which it can normally address. The control bit PR is used to indicate whether a symbol screen has priority over a graphic screen, or if the graphic screen has priority over the symbol screen.

To display a screen, a screen display routine from the executable code is called for execution by the control processor 128. The screen display routine will move the particular screen information which it is programmed to display from the nonvolatile memory (ROM or flash EPROM) to the display memory area of DRAM 137. The screen display program can then disable the digital processor 300 by clearing the enable bit EN to load the processor registers R1–R12 with the desired display attributes. Normally, the screen display routine will only disable the display of the digital processor 1302 by setting the blank bit BK if it needs to only reload the palette registers or line attribute registers.

The control processor 128 need not load all the processor registers because it can read them to determine if any changes are actually needed. For example, once the video parameters register R1 and most of the control registers R3 have been programmed once, they will not often need to be changed. Likewise, the color registers R6, R7 and R10, after they have been set up with the desired palette of colors, will remain relatively unchanged for many display scenarios. Moreover, because four different symbol set definitions or fonts can be used simultaneously, the line attribute and symbol set definition registers R11 need not be changed for every scene change.

The most likely registers to be changed are the registers R8 and R9 to indicate to the digital processor 300 where the screens are to be found in the DRAM 137. The next most likely registers to be changed are the screen parameter registers R2, R4 and R5 which position the different screens on the display area.

After the control processor 128 has set the display attributes in the registers R1–R12 to the desired display configuration, it will re-enable the digital processor 300 by setting the enable bit EN or clearing the blank bit BL to display the stored screens until the device is thereafter again disabled, or the display information or the configuration information is changed.

With reference to FIG. 14, the on-screen display information and display attributes are stored in the data portion of the ROM or Flash EPROM memory 134, 138 of the subscriber terminal. A display routine 322 loads the on-screen display controller 127 with the display attributes, and the display memory portion 305, 307, and 309 of the DRAM with the data which actually forms the display.

The display data and display attributes can be varied in the ROM or Flash EPROM 134, 138 in a number of ways. The ROM or Flash EPROM IC chips may be replaced with reprogrammed IC chips 326. Alternatively, the nonvolatile memory in which this data is stored can be on plug in modules, such as those shown as 138 in FIG. 2.

In yet another alternative, the display data and display attributes can be changed by downloading to them from the system manager 22 of the headend to the nonvolatile memory 134, 138 with other executable code and data. This is accomplished via downloaded program code transactions as described in the parent application of Bacon, et al., U.S. application Ser. No. 07/983,909 filed Dec. 1, 1992.

Another alternative is to provide a specified display transaction from the system manager of the headend. The display transactions are received over the distribution system and input to the subscriber terminal as a part of the vertical blanking interval data. The VBI data decoder 129 strips the VBI data from the tuned channel of the video and communicates with the memory controller 112 to temporarily buffer the display transaction data in area 320 of the DRAM 137.

The VBI data decoder 129 recognizes the display transactions as on-screen display data and display attributes, and buffers them in the portion 320 of DRAM 137 reserved for that purpose. Periodically, the control processor 128 will test a software flag to determine if any display transactions have been stored in the display transaction 320 area of the DRAM 137. When a display transaction has been stored, the control processor 128 will then call an expansion routine 324 which accesses the display transaction in DRAM 137 through the memory controller 112.

The expansion routine 324 will decode a command in the display transaction and with the parameters data provided in the transaction proceed to either change the display attribute data or expand the parameter data into on-screen information. The resulting data is stored in the data portion 328 of the Flash EPROM 134, 138. The control processor 128 may then call a display routine 322 to display this new on-screen data and display attributes in the same manner as other on-screen data and attributes.

The expansion routine 324 is a group of specialized sub-routines which are tailored to the commands of the display transaction to translate the high level commands of the transaction, into the specific on-screen display language of the display processor. The commands can be viewed as high level sub-routine calls for certain utility functions of the display processor.

In this manner the on-screen display transactions communicate a high level screen building language which allows a programmer from the headend of the subscription television system to change the on-screen displays of the subscriber terminals in a facile manner. Instead of having to program in the specific display language of the display controller, a programmer may compress these functions into a high level language describing the screen functions that he desires displayed.

The on-screen display transaction is shown in FIG. 16. The display transaction is generated similarly to other communication transactions in the subscription television system. The figure illustrates the basic format for a display transaction. The transaction has a header, bytes 0-6, which describe to the data decoders of the subscription television system information regarding the processing of the transaction. Byte 5 describes the transaction as a display transaction with a unique transaction code. In byte 0 of the header, several bits are set to label the transaction for global or addressed reception, and whether the transaction will be sent on the audio or VBI data channels. Bytes 1-3 are descriptors, if it is an addressed transaction, of the destination terminal and other information. The descriptors of a display transaction may associate a number of display transactions with a single screen or group of screens which are accessed by a display routine using that descriptor, for example, display screen #35.

The header is continued in byte 6 where a sequence number from 000000 to 111111 indicates which transactions should be grouped together. A last sequence bit is set in byte 6 when the final transaction of a sequence has been sent. The actual display data or the display attributes for a display transaction are stored in bytes 7-21 of the message.

With the display transactions any combination of display attributes and display data can be sent from the system manager to all of the subscriber terminals or any one of them. The symbol set definitions can be changed, deleted, or added to with this method to produce various screens without changing the screen definitions. The color palettes, the line attributes, and the symbol definition registers can be varied to produce great flexibility in configuring these displays.

While display transactions can be used to communicate on display data and display attributes in the format and language of the display processor 127, it is much more advantageous to build screens from a higher level language. This allows less data to have to be transferred by the transaction and more efficiently uses the communications resources of the subscriber terminal. Further, because the programmer is removed from the result of his actions, it is more certain the mistakes will not be made as the language is descriptive of the function being performed in the display. This makes the programming interface to the on screen display system much more user friendly.

In one preferred embodiment of a high level display transaction language, a command describing a function to be performed on the screen is accompanied by data parameters describing the variables of the function. An Appendix to U.S. application Ser. No. 08/072,291, filed Jun. 7, 1991, incorporated by reference, and not provided here, lists a plurality of these command and parameter combinations which form a display screen language.

For example, a command byte equal to zero may indicate that there are no more display transactions for building a particular screen. This transaction usually follows a series of transactions which have described a particular screen. This transaction allows the expansion routine to completely describe one particular screen before ending the transactions at this point.

A command byte equal to one may indicate that a color should be loaded into one of the color palette registers. The transaction identifies the particular register pair, and supplies a foreground color and a background color for that register pair.

A command byte equal to two may indicate that a line attribute register should be changed. The transaction indicates the one out of sixteen line attribute registers to be changed and the information to be loaded therein. Each line attribute register contains a palette register pointer, a control bit and a pointer to the symbol set definition registers. A special register indication (FF) indicates that all of the line attribute registers should be set to the parameters in the transaction.

A command byte equal to three may indicate that the border screen register should be loaded with a particular color. The color combination of Y, B-Y and R-Y to be loaded is provided by the parameter data section of the transaction.

There may be additionally several commands which apply to entire screens including commands 4, 5, and 6. A command byte equal to four indicates that an entire screen should be filled with a particular character. The data portion of the transaction indicates which character should be used to fill the entire screen. A command byte equal to five indicates that all of the symbols of a particular symbol screen should have the same attributes. The attributes which are the most significant seven bits of the symbol pointer, are stored in the transaction and loaded for all symbol pointers of a particular screen.

A command byte equal to six indicates that an entire screen should be filled with a particular character that have the same attributes. The expansion routine takes the character information from the transaction and loads the least significant nine bits of the symbol pointers of an entire screen with the character and the most significant seven bits of the symbol pointers with the attributes stored in the transaction. It should be evident that when using the commands 4, 5 and 6 that the symbol set definition (lien attribute definition command) should be sent with one or more of these commands to define the symbol set.

The command byte equal to seven indicates that the display processor should write n characters to the on screen display. The parameters data of the transaction indicate the row and column of where to start the characters, and subsequent data of the transaction indicate the number of characters (n) and a list of the characters to be displayed.

In a similar manner, a command byte equal to eight will cause an attribute to written to n symbols on a display. The data stored in the transaction indicate the starting row and column of the attributes, the number of times to write the attributes and which attributes should be given to the symbols.

A command byte equal to nine will cause a single character to be written to on-screen display n times. The information stored in the transaction includes the row and column of the on-screen display of where to begin writing the character, the number of times n to write the character and which character is to be written.

A command byte equal to ten will cause n characters to be written to a screen display with common attributes. The parameters data of the transaction include the row and column of the on-screen display to start the writing of the n characters, the number of n characters to write, the common attributes for each of the characters, and a list of the characters.

A command byte equal to eleven will cause n characters to be written to a screen display with n different attributes. The parameters data of the transactions includes the row and column of the on-screen display to start the writing of the n characters, the number of n characters to be written, and a list of the characters and attribute pairs.

A command byte equal to twelve indicates that a number of n characters from the display memory should be put up on the screen. The parameter data for the transaction indicates the position of the row and column where the characters should start and a parameter number indicating the particular parameter to be displayed. The number of n characters is then included as the last byte of the transaction.

A command byte equal to thirteen indicates that all the bytes in the interactive buffer of the DRAM 137 should be set to a particular value, the particular value, and a set of identification values.

A command byte equal to fourteen indicates that an on screen display should pause for a time out by looking for a select key press from the remote control of the subscriber terminal before transmitting the information to the DRAM interactive buffer. The parameter data includes the duration of the time out.

A command byte equal to fifteen causes the cursor of the on-screen display to position itself at an underline which is blinding. The command also causes the control processor to an interactive character, and set a character time-out. The parameters for this transaction are the row and column values of the underlined symbol, the high and low value for a valid character, the duration of the time-out and a offset number for storing the interactive character and in a buffer.

A command byte equal to sixteen indicates the control processor expansion routine should process the transaction as a no operation function. This function may be used for spacing display transactions and to provide default conditions for logical branches where the one branch is not functional.

Figure 17A:
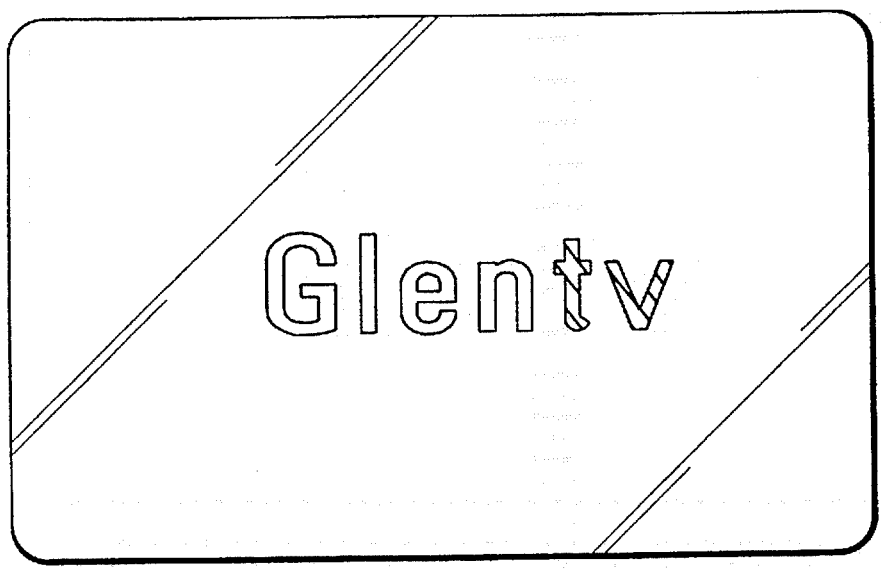
FIGS. 17A and 17B are examples of two screens for display on different terminals 14, where each screen represents a service name for different tiers of service.

Now, in regard to the present invention, it may be desirable for a system operator to have a system logo appear for a period of time after actuation of terminal 14 and prior to a key actuation of keypads 122, 126. Referring to FIG. 17A, by way of example, the stylized logo Glentv may be provided to that group of subscribers for display who subscribe to a service called Glentv. As described in U.S. application Ser. No. 07/018,932 and 07/018,933, filed Feb. 16, 1993, and incorporated herein by reference, billing computer 24 (FIG. 1) may provide input to system manager 22 to identify such a group of subscribers according to converter group selection criteria. A group may be addressed globally (everyone in the subscriber population), individually (by unique terminal address or serial number) or as a group.

Figure 17B:
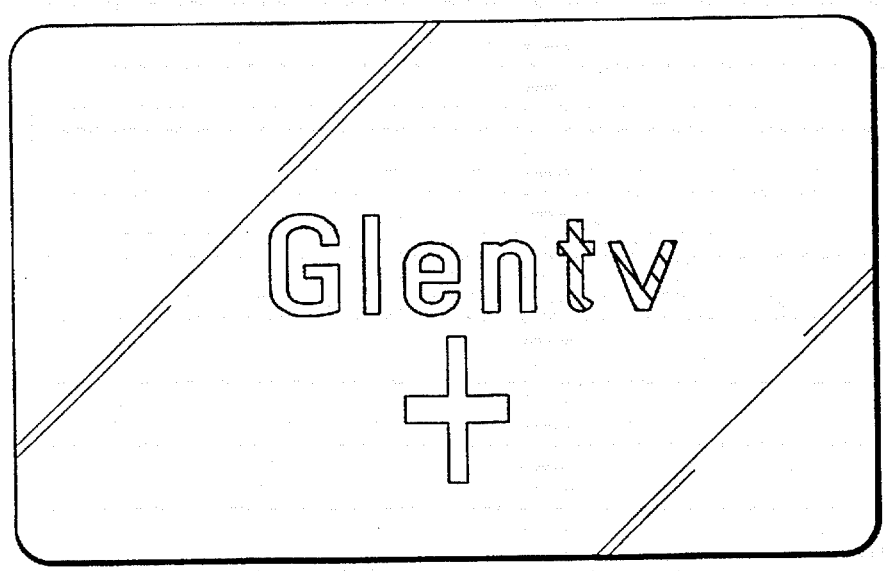

Yet another group of subscribers may subscribe to a higher tier of service for a premium, which service tier may be Glentv Plus. Referring to FIG. 17B, billing computer 24 may likewise identify such a group of subscribers to system manager 22. Such a group of subscribers may be controlled as described above to display the FIG. 17B logo for such a service.

As described above with respect to the three modes of display operation, either of FIGS. 17A or 17B may comprise a plurality of cubes. For example, the stylized G may be in multiple colors and comprise a plurality of, for example, four, six or twelve or more cubes of data. Referring briefly to FIG. 18B, there is shown a stylized G comprising twelve color cubes wherein ** comprises a foreground color, ... a background color, and—white (black not shown as used), wherein each cube is 13 by 12 pixels and the G is four cubes wide and three cubes high (totaling twelve cubes). Display control commands and code and cube data are either separately or otherwise provided to the system manager, but, preferably, and in accordance with the present invention, not provided by the manufacturer at all.

Figure 18A:
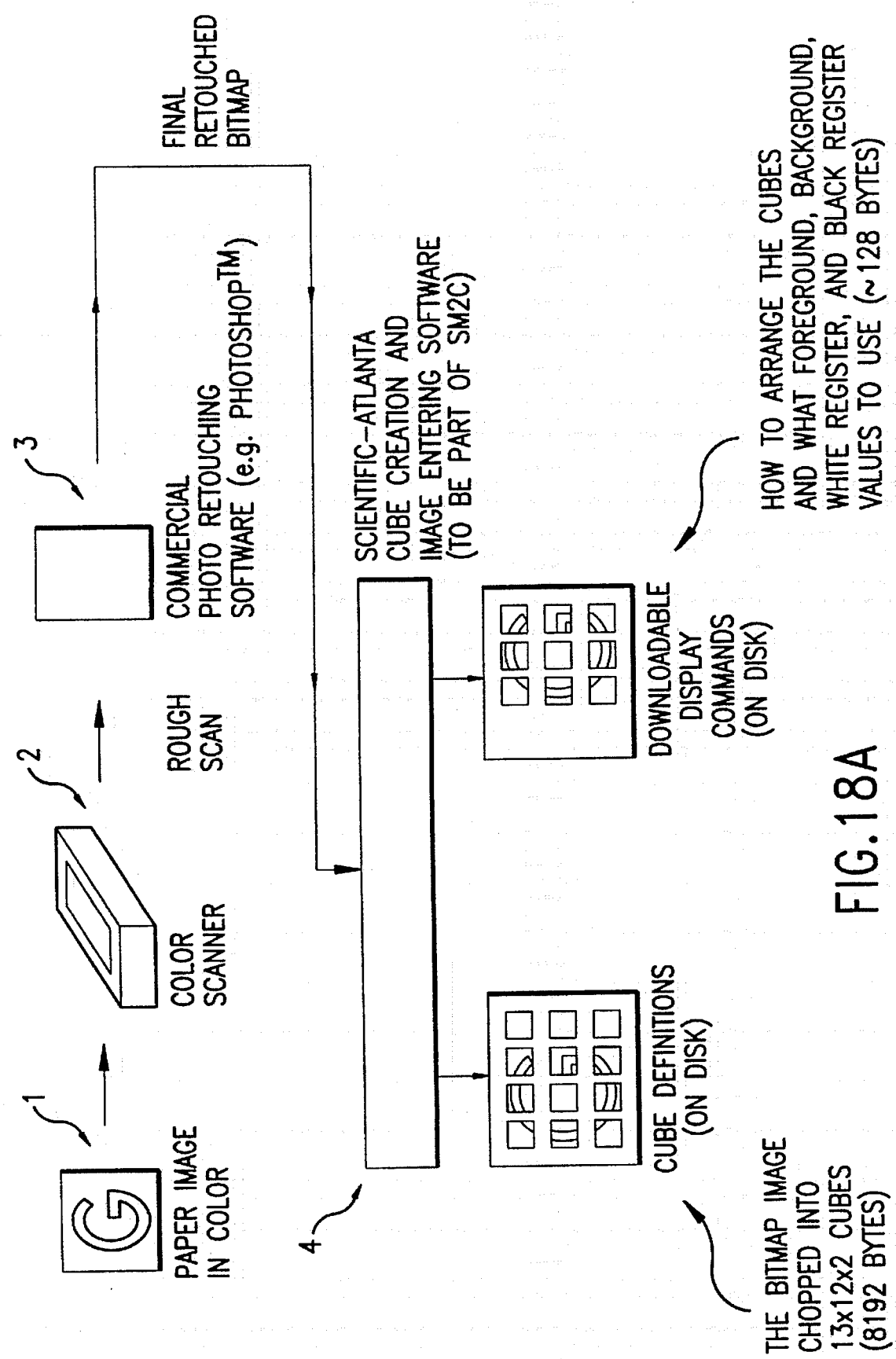
FIG. 18A comprises a flow diagram of a method of providing graphics and caption data at a manufacturer's location per cube creation and image creation software (step 4)
Figure 18B:
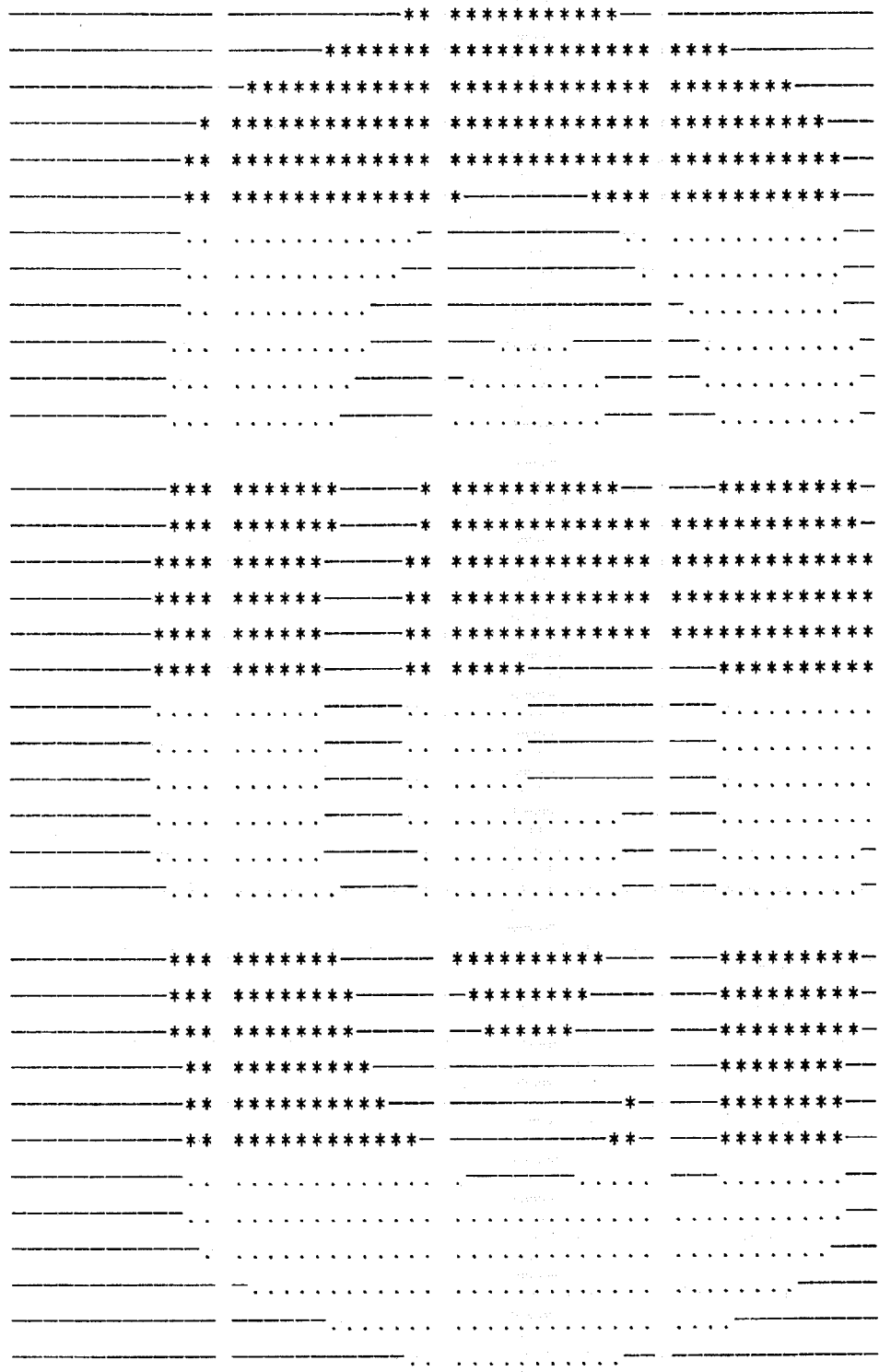
FIG. 18B comprises a representation of a stylized, color letter G forming 12 cubes.

Referring now to FIG. 18A, steps at a manufacturer's site are shown for generating cube definition data (a first memory) and downloadable display commands (a second memory). Of course, the generated cube definition and code data may be stored on the same disc for delivery to the system manager site (a single memory). In a first step, a high definition color copy of the logo is provided by the system operator to the manufacturer. In a second step, a typical color scanner is utilized to scan the color copy of, for example, FIG. 17A or 17B, to generate a bit map of data, typically stored in memory of a personal computer. A roughly scanned image is typically generated as a result of the scanning process that can be viewed on a high definition monitor of a personal computer. In step 3, a commercial retouch software package may be utilized to obtain an improved image in bitmap memory. Acceptable software may comprise the PHOTOSHOP (TM) software or other commercially available software available from vendors.

At the manufacturer site, then, the finished image bitmap is appropriately manipulated and sized for television display and encoded into cube definition data as described above according to step 4. The output of the process, shown in FIG. 18B for a stylized G logo, is first and second memory locations of a single disk or pair of discs, tape or other memory such as an S-RAM. More particularly, the cube definition data comprises the bitmapped image segregated into a plurality of, for example, twelve 13×12×2 pixel cubes, altogether comprising, for example, 8192 bytes. In a similar manner, downloadable display commands for the screen comprising the cubes as encoded are generated and separately stored. Such display commands describe, as described above, where to start and place the graphic, how to arrange the cubes to form the graphic, the foreground, background, black (not used in the G example) and white register data and the like, altogether comprising approximately 128 bytes.

It may be understood from FIG. 1 that not all the elements of FIG. 1 are required and utilized to transmit the cube data, program code and command data to the terminal 14 or group of terminals. For example, one scrambler 44, 46, 48, 50, 52 may be designated as a download scrambler. Another scrambler may be designated as a barker/text channel scrambler or the same scrambler may be utilized for both transactions. Addressed commands (global, group or individual) may be utilized to transmit either form of data via outband transmitter 54 or the scrambler(s) may transmit inband addressed data via inband video data or inband audio data transmission means. Consequently, an ATX 54 may be used for out-of-band transactions or data transmitted via an unscrambled channel via a data repeater.

Figure 18C:
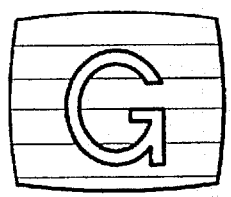
FIG. 18C comprises of a print screen of a stylized letter G as downloaded and displayed on an associated television set and FIG. 18D comprises a terminal memory print-out of the character and graphics memory of terminal 14, wherein cube data for the letter G is shown towards the center of the screen.
Figure 18D:
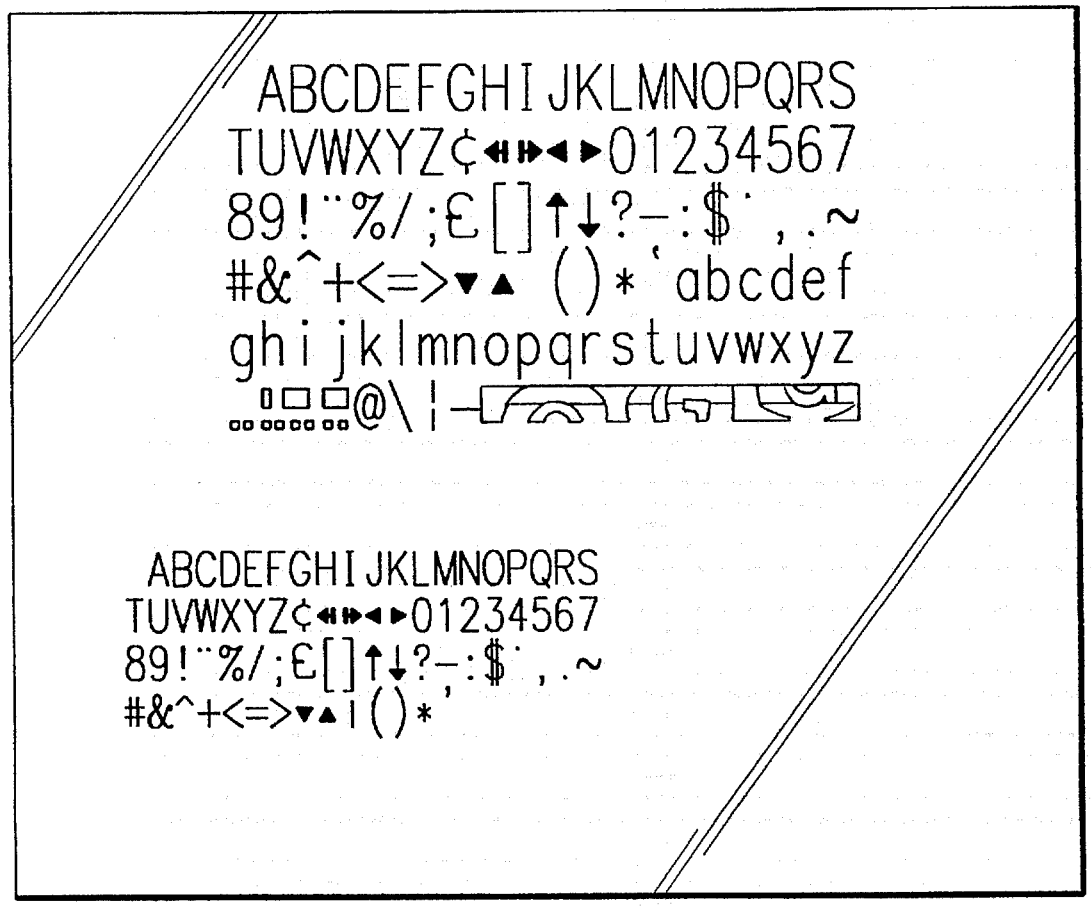

FIG. 18C shows a display of the stylized G of our example, in color, taken from a print screen of a display on an associated television 20 via terminal 14. The on screen display processor 127, to generate the display, has reacted to downloaded program code, cube definition data and display control commands stored in terminal memory. The display control commands, for example, control the terminal to display the stylized logo immediately upon powering up the terminal for a predetermined period of time, preferably until a command is entered by a user of the terminal. FIG. 18D comprises a print screen of the terminal memory showing cube definition data for the stylized letter G in the middle of the screen, surrounded by standard 8 by 12 by 2 alphanumeric character cube definition data.

Figure 19:
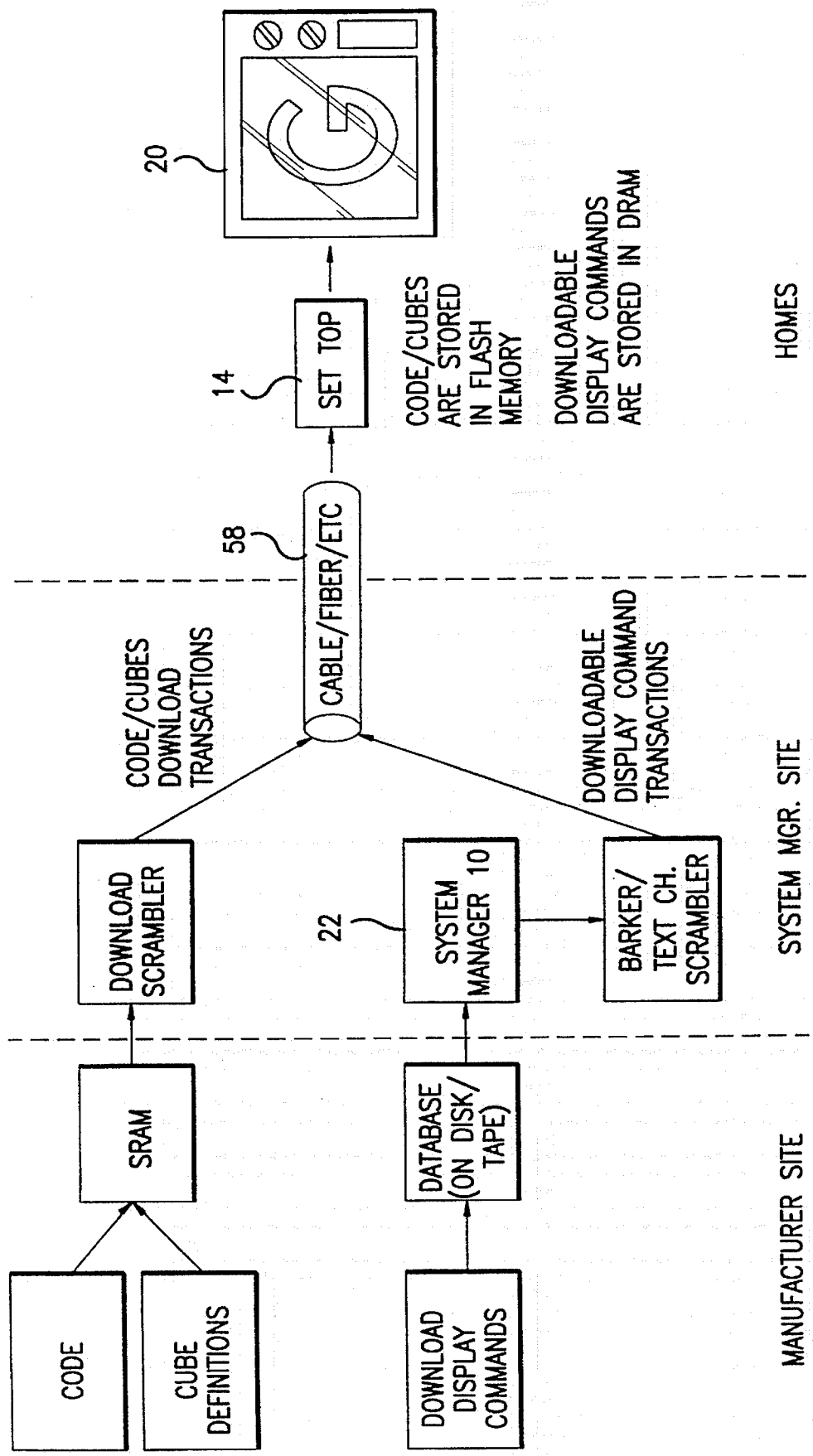
FIG. 19 comprises a flow diagram for a first embodiment of a method of providing the graphics and caption data, code and downloadable display commands via the manufacturer through the system operator to the subscriber terminal 14 of FIG. 2.

Referring now to FIG. 19, and by way of example, there is shown a first method of providing cube definition data, code and downloadable display command code. At the manufacturer site at the left of the figure, there is shown the process of FIG. 18. Code and cube definition data are provided at the output of steps 1–4 in the form, for example, of an S-RAM. The S-RAM also contains program code for reconfiguring the terminal program code for, for example, defining the display of the cube definition data. Program code and cube definition data will be more fully explained in connection with FIG. 21. Also, downloadable display command code is provided in the form of a database, preferably on disk or tape. These memories are then provided to the system operator for use at the site 10 of the system manager 22 and the location of scramblers, headend site 12, which may be the same site as site 10.

The SRAM containing the cube definition data and code is plugged into the memory of download scrambler. The download scrambler then simultaneously transmits the code/cube data via download transactions individually, by group, or globally to subscriber terminals 14 via cable 58. Meanwhile, the disk or tape of downloadable display commands is inserted and retrieved for storage in system manager 22, preferably a System Manager 10 network controller.

The system manager 10, for example, then forwards the data to a designated barker/text channel scrambler which transmits the display command data transactions over the cable 58 to the terminals 14. Code/cube definition data is preferably stored in ROM or flash EPROM 134, 138 according to this method while downloadable display commands are stored in DRAM 137.

As described above, groups of subscribers may be defined and addressed according to the present invention, or the subscribers may all be addressed globally, or the subscribers may be addressed individually. For example, in accordance with the present invention, two groups of customers may be defined having two different tiers of service. When a first group of subscribers turns on their terminals and their televisions, those televisions display FIG. 17A. Premium service customers, or a second group of subscribers, see a display of FIG. 17B. After a predetermined period of time, or after a subscriber actuates a key of their remote control, the display may disappear and a television station viewed.

Moreover, according to U.S. Pat. No. 4,911,011, incorporated herein by reference, display control command or other data, may select a background audio channel, besides the audio for a selected television channel, to accompany the display of the downloaded graphic. For example, a theme song for the system operator or an audio barker channel may be selected and output to the television 20, the audio channel being an associated background audio channel predetermined by the headend. For example, one audio barker channel or signal may be output for FIG. 17A, which may represent screen number thirty-five, and a second audio barker channel may be output for FIG. 17B, which may represent screen number thirty-six.

Figure 20:
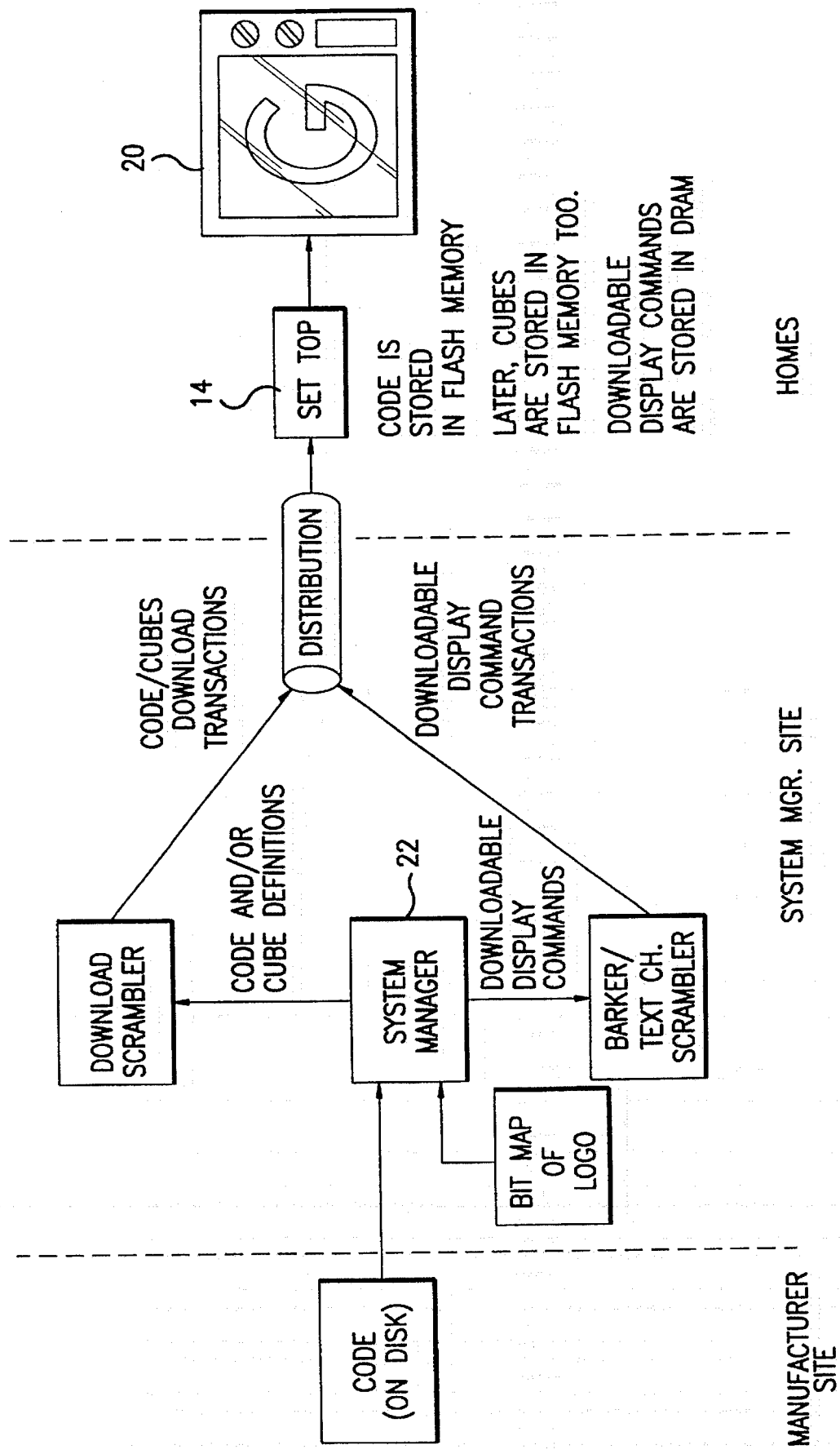
FIG. 20 comprises a flow diagram for an improved second embodiment of the method of FIG. 19.

Now a second method will be described in accordance with FIGS. 20 and 21 in which the subscriber terminal 14 is updated with new program code such that code and cube definition data are stored in ROM or flash EPROM. Activities at the manufacturer's site are minimized. Referring to FIG. 20, program code on disk (or other suitable memory) is provided by the manufacturer to update terminal 14 software to a new level permitting storage in, for example, flash EPROM only. The system operator creates their own cube definition data by scanning in their own logo and captions and retouching the bit map as required. Moreover, the system operator generates their own display commands, for example, so that the display of the screens of FIGS. 17A and 17B may be varied as to when, how, for how long and the like the screens are displayed.

Code and/or cube definition data is forwarded to the terminal 14 via transactions over cable 58. Downloadable display commands are forwarded via barker/text channel scrambler and cable 58 to terminal 14.

Figure 21:
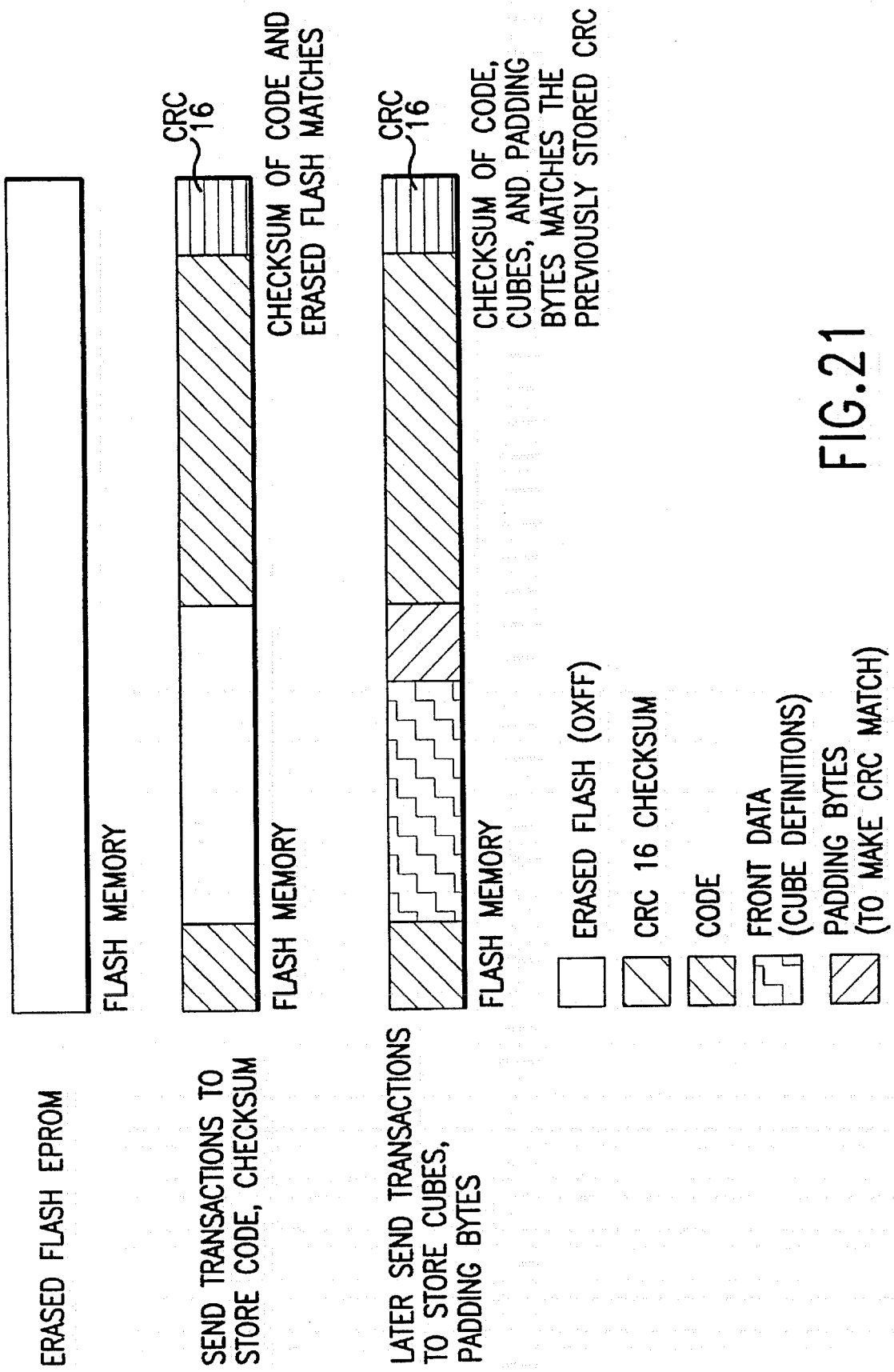
FIG. 21 comprises a diagram showing transactions for clearing terminal memory, loading memory with code including memory gaps and subsequently filling the memory gaps with downloaded cube definition data.

Referring to FIG. 21, there is shown code and cube definition data in flash memory 134. In a first transaction, flash memory 134 is erased. A second transaction, according to the second method, is to provide program code and a gap in flash memory 134, followed by more code and a checksum of code plus erased flash memory. According to well known techniques, the checksum should match or data should not be accepted for storage in terminal 14. Finally, once the system operator has prepared new cube definition data for transmission, a subsequent transaction forwards the new cube definition data (font data) and padding bytes as required to fill the gaps in flash memory. Again, the checksum for the new transaction should match or the transaction should not be performed by terminal 14.

Note from FIGS. 20 and 21 that the system manager 22 preferably includes a scanner input arrangement and retouch software for design logos in addition to manufacturer supplied software for controlling the generation of code/cube definition data and downloadable display command data as depicted in FIG. 18. On the other hand, even if the system operator is not so equipped, the terminal 14 can be updated to accept new cube definition data to fill gaps in downloaded and stored code in terminal memory when and after the new cube definition data is provided by the manufacturer.

Figure 22:
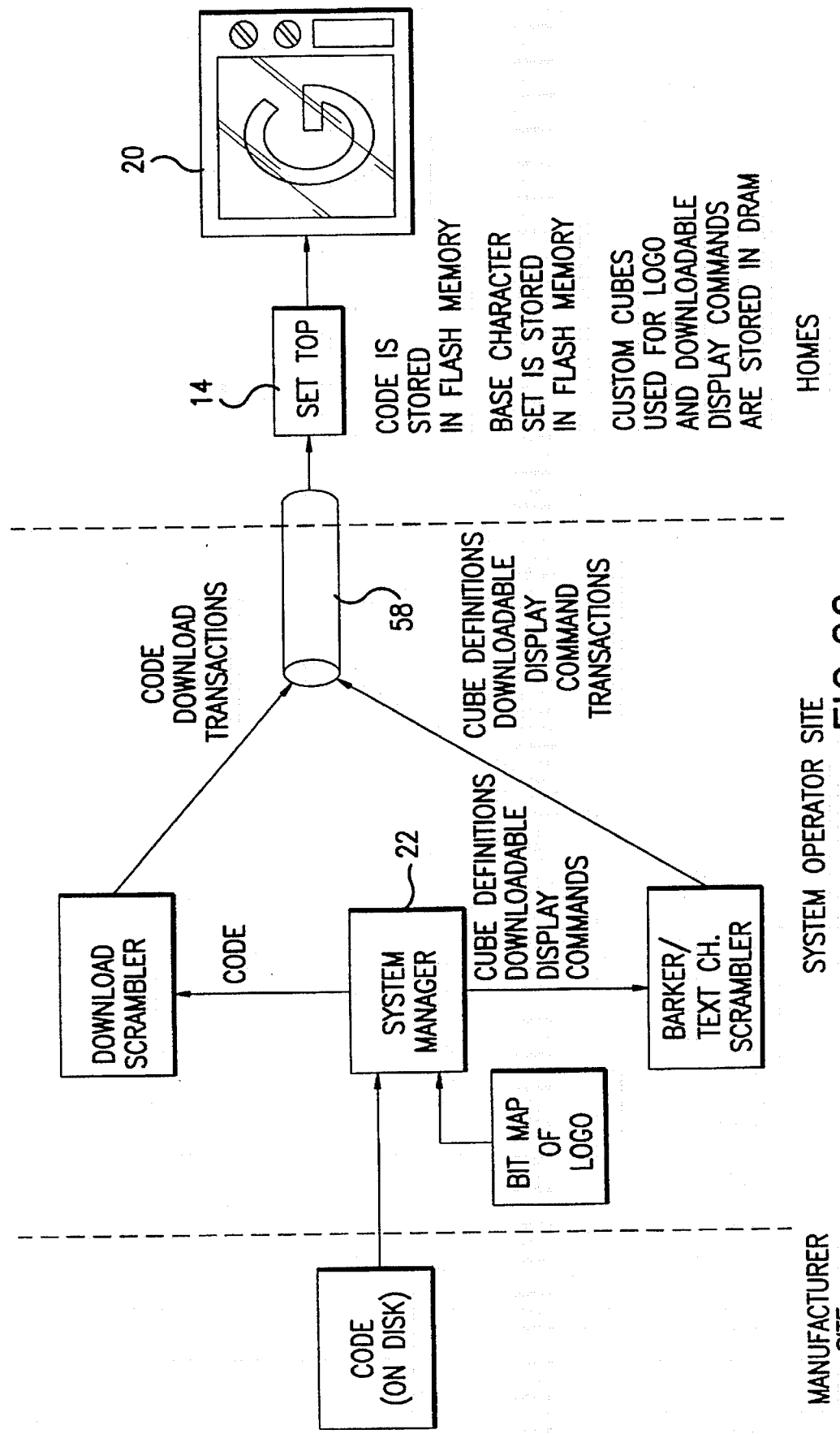
FIG. 22 comprises a flow diagram for a further improved method of downloading graphics data wherein only program code is provided by the manufacturer. The system manager downloads the code, for example, via a download scrambler and downloads their own graphic logo and display control commands without manufacturer intervention.

Now a third method of providing custom designed graphics and captions is described in connection with FIG. 22. In this embodiment, program code data only is provided by the manufacturer for installation in system manager 22. Code data is forwarded via code download scrambler and cable 58 to update software for controlling terminal 14.

The system operator provides their own cube definition data and display control commands which are forwarded via barker/text channel scrambler and cable 58 to terminal 14. The download scrambler is not utilized, as in FIGS. 20 and 21, for downloading cube definition data. The program code is downloaded and stored in terminal flash memory. The base character set is stored in flash memory. The custom cubes for logo and captions that the system operator has generated using their own software and downloadable display commands are stored in DRAM 137. The cube data is copied from flash memory to DRAM 137 when the display processor is reset. Transactions containing the custom cubes can be sent later to overwrite the cube definition data in DRAM 137 as necessary by the system operator.

Figure 23A:
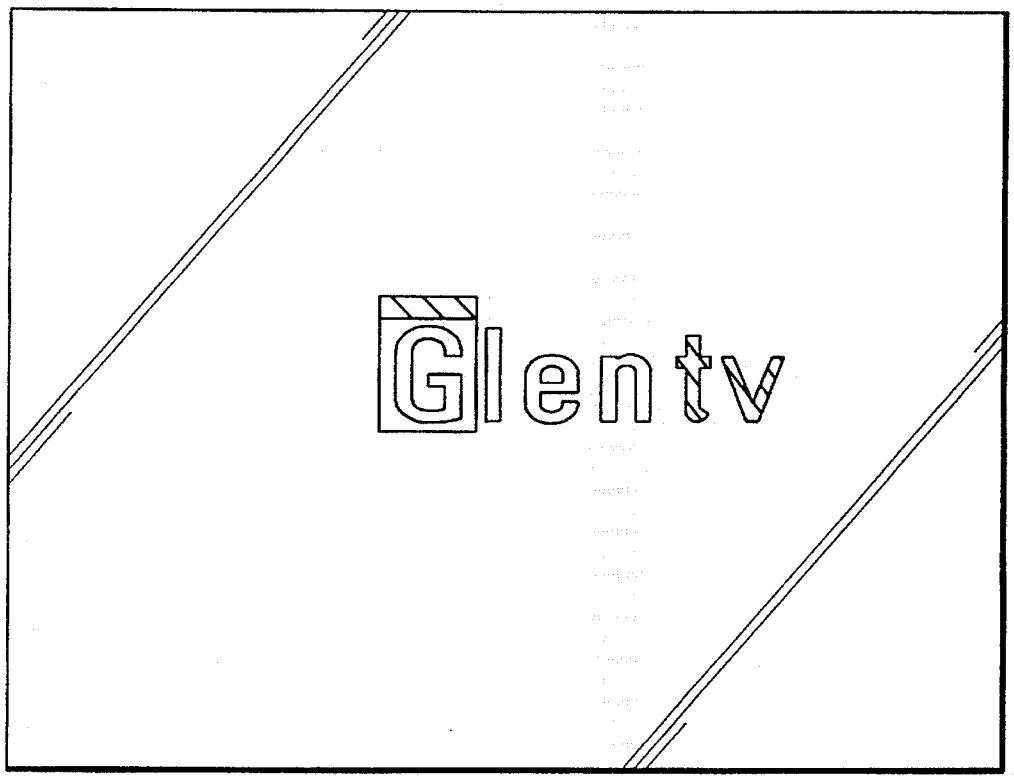
FIG. 23A is a print screen for the screen Glentv composed of graphic cube definition data displayed according to the present invention on an associated television set and FIG. 23B is a print screen for a terminal memory of alpha numeric character and graphic cube definition data, the data for the graphic Glentv being shown in the center of FIG. 23B.
Figure 23B:
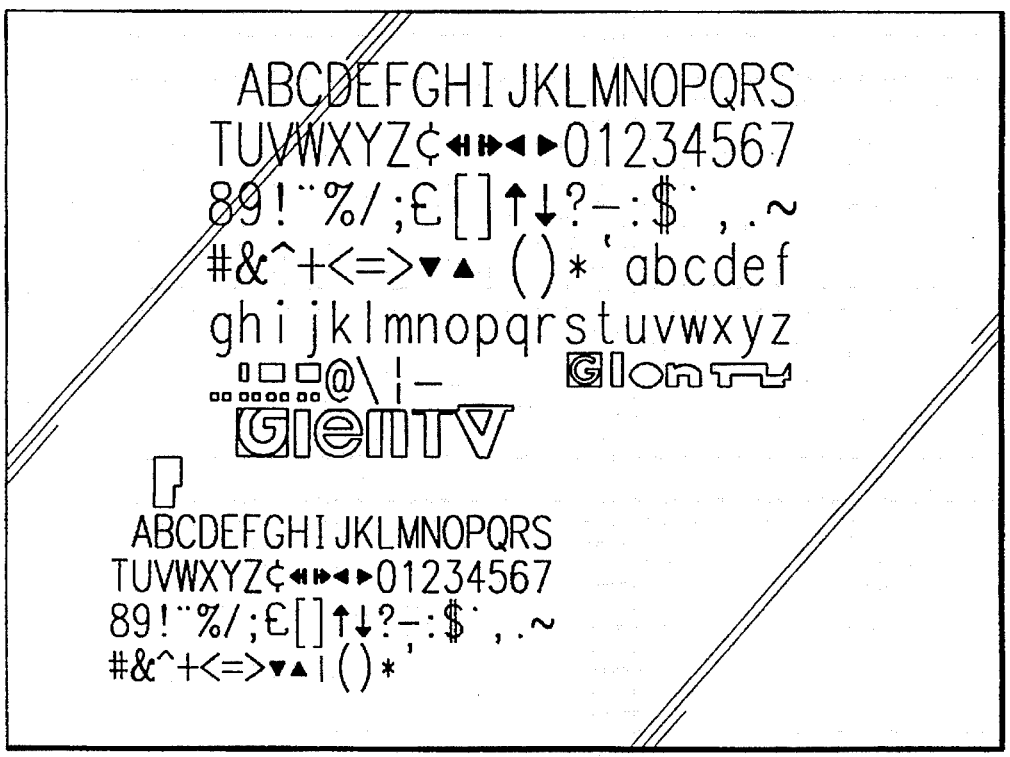

Finally, the photograph of FIG. 23A comprises a print screen of a complete, stylized logo for Glentv. FIG. 23B shows character and cubic custom graphic data, by way of example, for showing, at the center of the screen a storage of cubes representing Glentv. FIG. 23A comprises a print screen of a screen, for example, number 35, for Glentv, which may be displayed as described above in accordance with programmable characteristics determining when it is displayed, how long it is displayed, and, of course, how it is displayed.

While there has been shown and described the preferred embodiments of the methods and apparatus of the inventions, it will be evident to those skilled in the art that various modifications may be made thereto without departing from the spirit and scope of the inventions as set forth in the appended claims and their equivalents.

What is claimed is:

1. A method of downloading graphics display generation data and program code data to a terminal of a multi-service distribution system for display on an associated television display comprising the steps of:

generating a bit map of graphics for display, encoding the bit map into cube definition data, transmitting the cube definition data from a headend of the system to at least one terminal, storing the program code data and cube definition data in terminal memory, and outputting display data in accordance with the cube definition data for display on the associated television.

2. A method according to claim 1, the bit map generation step comprising the step of scanning a selected graphics image to generate bit map data.

3. A method according to claim 1, the cube definition data encoding step comprising the step of generating cubes of data having predetermined length, width and height in pixels.

4. A method according to claim 1, the cube definition data transmission step comprising the transmission of the cube definition data via a barker/text channel scrambler coupled to a system manager.

5. A method according to claim 1, further comprising the step of transmitting the program code data via a downloadable code scrambler.

6. A method according to claim 1, the cube definition data transmission step comprising the steps of transmitting a first transaction to erase terminal memory, transmitting a second transaction for loading the terminal memory with the code data and forming at least one erased memory gap, and transmitting a third transaction for transmitting the cube definition data for filling at least a portion of the at least one erased memory gap.

7. A computer program for performing the method of claim 1.

8. The method of claim 1 further comprising the steps of generating and transmitting downloadable display commands for storage in terminal memory.

9. The method of claim 8 wherein said terminal memory comprises dynamic random access memory.

10. The method of claim 8 further comprising the step of storing a base character set and the program code data in terminal flash memory and storing the cube definition data and downloadable display commands in dynamic random access memory of the terminal.

11. The method of claim 8 wherein the downloadable display commands describe where to place the cube definition data on the associated television.

12. The method of claim 11 wherein the downloadable display commands further describe where to start and how to arrange the cube definition data on the associated television.

13. Apparatus for controlling the method of claim 1 comprising a system manager computer, the terminal, and data transmission means for transmitting data to the terminal for display.

14. The method of claim 1, the cube definition data transmission step comprising the step of transmitting first cube definition data to a first group of terminals and second cube definition data to a second group of terminals.

15. The method of claim 1, the cube definition data transmission step comprising the step of transmitting said cube definition data by one of in band audio, in band video or outband transmission means.

16. The method of claim 1, the cube definition data comprising background and foreground luminance and chrominance data for a planar image having two dimensions.

17. The method of claim 1, wherein the step of outputting of display data continues for a predetermined period of time.

18. The method of claim 17, wherein the predetermined period of time is determined by the actuation of a key by a user.

19. The method of claim 1, wherein the output display data is accompanied by a predetermined background audio signal.

20. A method according to claim 1, the cube definition data encoding step comprising the step of generating multiple cubes of cube definition data.

21. A method according to claim 1, the cube definition data encoding step comprising the step of generating cubes of cube definition data in multiple colors.

22. The method of claim 1 wherein the program code data is reconfigurable so as to provide customized downloadable display commands.

23. Terminal apparatus for receiving downloaded graphics data, downloaded display commands and program code data comprising:

an in band data receiver for receiving data transmitted via a television signal, a first flash memory, coupled to the in band data receiver, for storing the downloaded program code and an alphanumeric character set, and a second dynamic random access memory, coupled to the in band data receiver, for storing the downloaded display commands and cube definition data.

24. System control apparatus for downloading graphics data, display commands and program code comprising:

a system manager for generating the graphics data and display commands for downloading and having input means for receiving the program code for downloading, a code download transmitter for downloading the program code via code download transactions and a graphics data download transmitter for downloading generated graphics data and display commands via generated graphics download transactions.

25. The system control apparatus of claim 24, the code download transactions comprising globally addressed transactions and the generated graphics download transactions comprising one of individually addressed or group addressed transactions.

26. The system control apparatus of claim 24, the system manager further comprising a computer equipped with applications software, a monitor, a keyboard and a scanner coupled to the computer for generating the graphics data and display commands from a scanned graphics image.

27. The system control apparatus of claim 24 wherein one of said code download transmitter or said graphics download transmitter comprise one of an in band video data, in band audio data or out of band data transmitter.

* * * * *